United States Patent [19]
Chisaka

[11] Patent Number: 5,864,636
[45] Date of Patent: Jan. 26, 1999

[54] DEVICE FOR INPUTTING CHARACTERS BY HANDWRITING

[75] Inventor: Masanobu Chisaka, Yamatokooriyama, Japan

[73] Assignee: Sharp Kabushiki Kaisha, Osaka, Japan

[21] Appl. No.: 579,155

[22] Filed: Dec. 27, 1995

[30] Foreign Application Priority Data

Dec. 27, 1994 [JP] Japan .................................. 6-325258

[51] Int. Cl.$^6$ ...................................................... G06K 9/78
[52] U.S. Cl. ............................ 382/189; 382/315; 345/179
[58] Field of Search ................................ 382/189, 187, 382/188, 185, 201, 309, 310, 311, 315, 199, 123; 345/179, 162

[56] References Cited

U.S. PATENT DOCUMENTS

| | | | |
|---|---|---|---|
| 4,491,965 | 1/1985 | Yoshimura | 382/177 |
| 4,953,225 | 8/1990 | Togawa et al. | 382/179 |
| 5,166,666 | 11/1992 | Tanaka | 345/179 |
| 5,305,394 | 4/1994 | Tanaka | 382/189 |
| 5,361,310 | 11/1994 | Ishigaki | 382/187 |
| 5,502,461 | 3/1996 | Okamoto et al. | 345/173 |
| 5,583,543 | 12/1996 | Takahoshi et al. | 345/179 |
| 5,675,665 | 10/1997 | Lyou | 382/187 |
| 5,717,939 | 2/1998 | Bricklin et al. | 382/189 |

FOREIGN PATENT DOCUMENTS

| | | |
|---|---|---|
| 61-243582 | 10/1986 | Japan . |
| 4-199485 | 7/1992 | Japan . |
| 5-197477 | 8/1993 | Japan . |

Primary Examiner—Jon Chang

[57] ABSTRACT

A character input frame is displayed in a popping-up manner and erased automatically in a position in which an operator desires to effect a handwriting input. A character input frame information generating section generates character input frame information based on coordinate input position information from a coordinate input section, and stores the information in a first storage section. A character recognizing section recognizes a character extracted by a character extracting section, and stores character code data of the result of recognition into a second storage section. A display control section displays in a popping-up manner the character input frame from an initial input position on a display panel based on the character input frame information from the first storage section. The character input frame information generating section erases storage contents of the first storage section based on recognition completion information from the character recognizing section. The character input frame is automatically erased when the character recognition is completed. During operation, the character input frame is composed of a mere frame where its cells are internally transparent, so that a printing type is not hidden behind the frame.

32 Claims, 33 Drawing Sheets

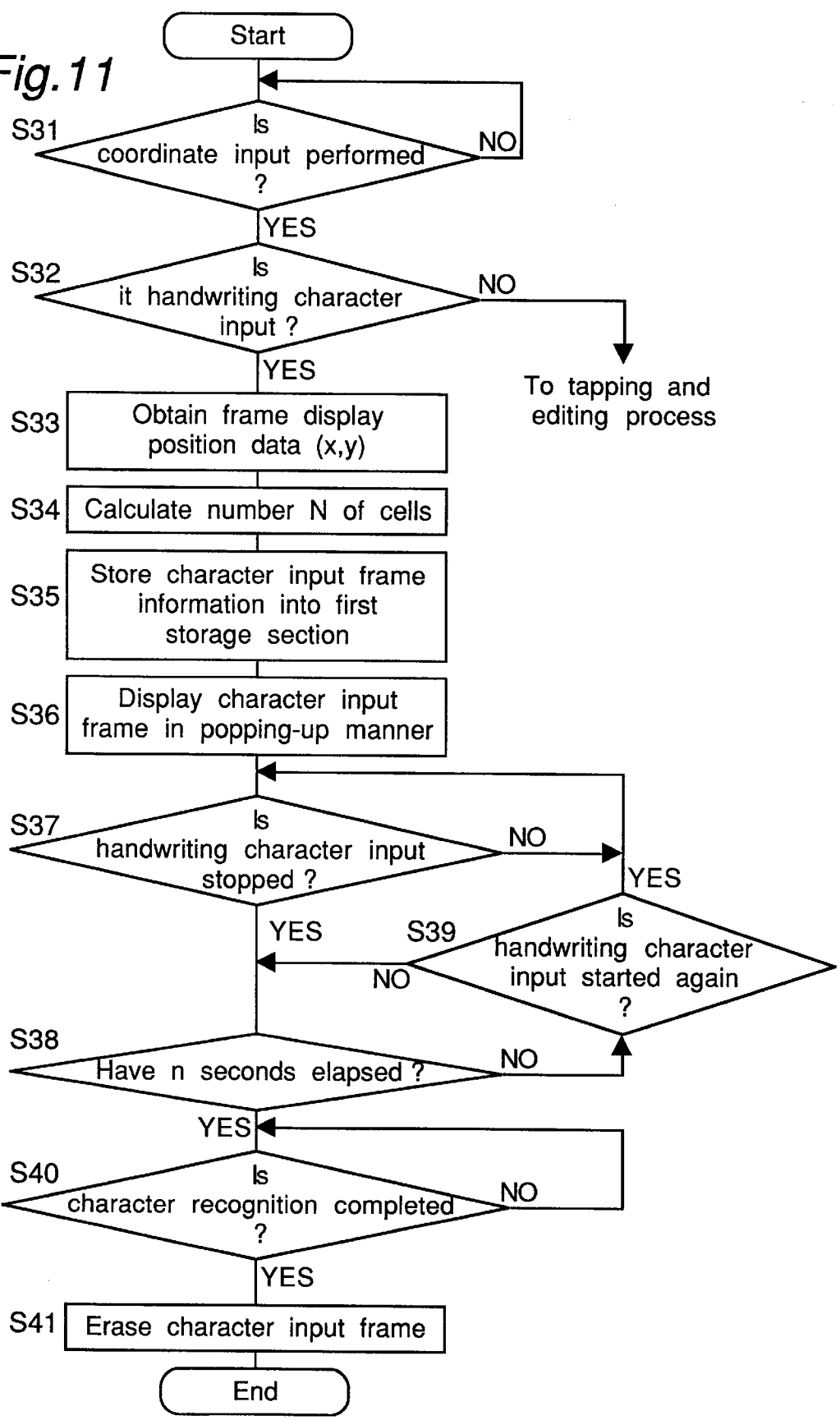

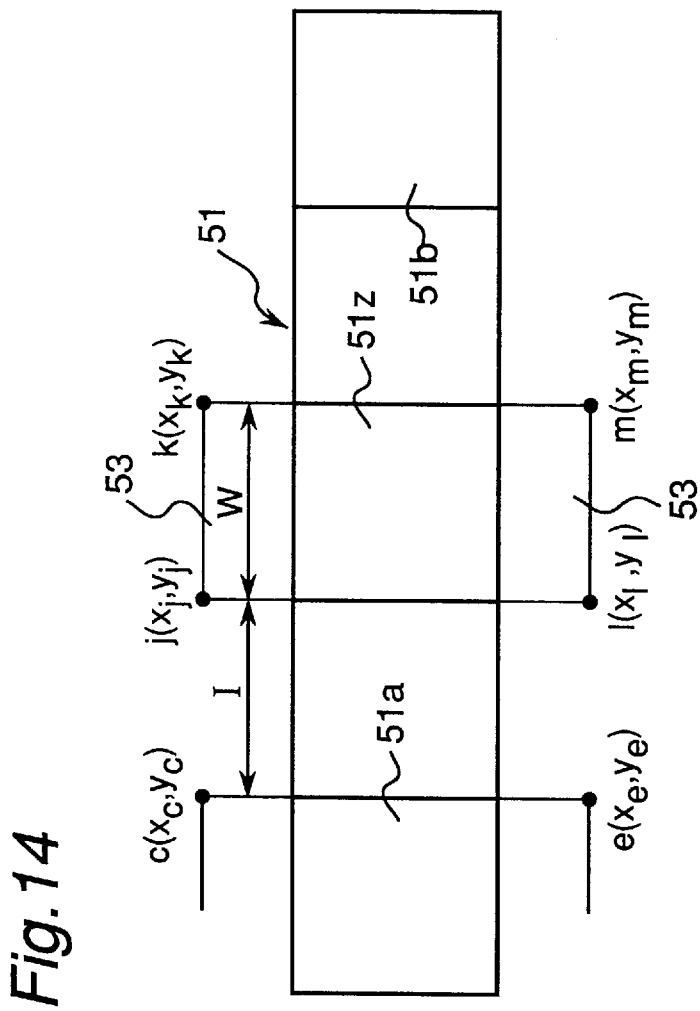

DEVICE FOR INPUTTING CHARACTERS BY HANDWRITING

BACKGROUND OF THE INVENTION

1. Field of the Invention

The present invention relates to a device for inputting characters by handwriting for forming a document by extracting a handwritten character and thereafter recognizing the character.

2. Description of the Background Art

Conventionally, as a device for inputting characters by handwriting, there have been such devices as disclosed in Japanese Patent Laid-Open Publication Nos. HEI 4-199485 and HEI 5-197477. In those devices, a special handwriting input frame is always displayed in a specified position on a transparent tablet, or a character input board having a special handwriting input frame is displayed in a popping-up manner in a specified position on a screen when a handwriting input mode is selected.

The "character input device" disclosed in Japanese Patent Laid-Open Publication No. HEI 4-199485 is comprised of a position input unit, a processing control unit, a display unit and an external storage unit. Then by displaying a character input board including a character input frame of specified dimensions on the display unit when a character input mode is selected, a character is allowed to be inputted by handwriting consistently in a specified size regardless of the size of a character input item.

In the "handwriting information device" disclosed in Japanese Patent Laid-Open Publication No. HEI 5-197477, by displaying a character input screen provided with a handwriting guide line in the character input frame and operating a layout changing means, the size of the character input frame and a handwriting guide line are set for layout in an arrangement most appropriate for the operator's sense of use.

In either of the cases, after completion of character recognition, each character inputted by handwriting in the character input frame is displayed in the character input frame, an independently determined position, or an arbitrary position designated by the operator in a printing type form.

There is a further device for inputting characters by handwriting as disclosed in Japanese Patent Laid-Open Publication No. SHO 61-243582.

In the "device for inputting characters by handwriting" disclosed in Japanese Patent Laid-Open Publication No. SHO 61-243582, a valid input area setting means sets a valid input area by enlarging an input area frame in which the existence of a tip end of an input pen is detected among a specified number of input area frames set on a tablet. If there are traces of a character existing in the set valid input area, the character is detected as an input character to the input area frame even when the character is jutting out of the input area frame.

The prior art devices for inputting characters by handwriting have problems as follows.

(1) Problems of the devices for inputting characters by handwriting disclosed in Japanese Patent Laid-Open Publication Nos. HEI 4-199485 and HEI 5-197477.

As described above, the special handwriting input frame is displayed in a specified position on the transparent tablet. Therefore, the position in which a is handwriting input can be effected is limited, and further the position in which a printing type is displayed as a result of recognition or extraction differs from the position in which the character input is effected by handwriting. Consequently, the operator cannot write each character either in a position in which the operator easily writes the character or in the position in which the operator desires to input or display the character on the tablet. Therefore, the operator feels far differently from his or her feeling in handwriting a character on an ordinary notebook or the like, meaning that a natural-touch handwriting input cannot be effected.

Furthermore, it is required to execute an operation of cancelling, for example, the character input mode in erasing the special handwriting input frame displayed on the transparent tablet, and this also results in a very troublesome handwriting character input.

(2) Problems of the device for inputting characters by handwriting disclosed in Japanese Patent Laid-Open Publication No. SHO 61-243582.

As described above, the specified number of input area frames are set on the tablet. The above naturally results in limitation of the area in which the input area frames can be set on the tablet, so that the area of the tablet cannot be effectively utilized.

Furthermore, in spite of the advantage that correct character recognition can be effected even though the traces of handwriting by the input pen are jutting out of the input area frame, a sufficient effect cannot be achieved unless the valid input area is set according to character handwriting trace conditions such as specification of the position of the input area frame in which the tip end of the input pen is located, start position coordinates of the character handwriting trace and coordinates in the middle of a stroke drawn continuously by the input pen operated without being out of contact with the tablet.

(3) Common problems of the conventional systems

When successively inputting characters by handwriting, it is common to operate an adopting button, an inserting button or the like every time each character is repetitively hand written in a fixed character input frame to thereby insert a printing type that is a result of recognition (or a result of extraction) into a position in which the printing type is desired to be inputted. However, in such a case, the character input position is fixed. Therefore, when the character input position is located apart from the printing type inserting position, it is impossible to effect character input while recognizing the previously inputted character. Furthermore, it is required to execute a character inserting operation every time a character is inserted, and it can be said that this is different from natural notetaking.

FIG. 33 shows an exemplified display screen of a conventional device for inputting characters by handwriting, while FIGS. 34A through 34D show an exemplified operation of the device. A character input frame 1 is set in a character input board 2. The character input board 2 is opaque. Therefore, when the character input board 2 is displayed on printing types which have been already displayed in a manner as shown in FIG. 34A, the printing types are hidden behind the character input board 2 as shown in FIG. 34B. On the character input board 2, there are further set editing buttons 3 for such functions as deletion, adoption and input for use in inserting a character after recognition. Therefore, as shown in FIGS. 34B and 34C, a range of setting of the character input frame 1 is limited by the editing buttons 3.

It cannot be said that the above arrangement can assure a natural-touch handwriting input as in handwriting a character on an ordinary notebook.

In conventional devices for inputting characters by handwriting, the size of each cell of the character input frame displayed on the transparent tablet is generally fixed. In view of the above, according to the device for inputting characters by handwriting disclosed in Japanese Patent Laid-Open Publication No. HEI 5-197477, the size of the character input frame and the number of handwriting guide lines can be changed by operating a layout changing means. However, this function is to set them for layout after a character input frame of a specified size and a specified number of handwriting guide lines are displayed, meaning that neither a character input frame of which size has been preparatorily set nor handwriting guide lines set in amount to an arbitrary number can be displayed in a popping-up manner.

In order to achieve a natural-touch handwriting input in view of the device for inputting characters by handwriting in which the character input frame is displayed on the transparent tablet, a character recognizing device with frame-free handwriting input has been already proposed. However, in the case of this character recognizing device, there arises another problem that a character recognition error tends to occur due to erroneous character extraction because no frame is provided for the handwriting input.

SUMMARY OF THE INVENTION

The object of the present invention is therefore to provide a device for inputting characters by handwriting capable of automatically displaying in a popping-up manner and erasing a transparent character input frame of an arbitrary size in a position in which an operator desires to effect a handwriting input, and automatically extracting and recognizing the character inputted by handwriting in the character input frame, thereby allowing a natural-touch note-taking to be achieved.

In order to achieve the aforementioned object, there is provided a device for inputting characters by handwriting in which trace coordinate data of a character is extracted by a character extracting section from trace coordinate data from an input section laminated on a display panel, and the extracted character is recognized by a character recognizing section to thereby display on the display panel a trace of a handwriting input based on the trace coordinate data and the recognized character by a display control section, comprising: a character input frame information generating section which generates character input frame information for displaying a character input frame representing a handwriting input area in an initial input position on the display panel and stores the information into a first storage section; the display control section displaying on the display panel the trace of the handwriting input and the recognized character as well as the character input frame with the initial input position on the display panel used as a reference position based on the character input frame information stored in the first storage section.

According to the present invention, the trace coordinate data from the input section is transmitted to the character extracting section. Then, trace coordinate data of one character is extracted by the character extracting section and recognized by the character recognizing section. Further, based on the trace coordinate data from the input section, character input frame information is generated by the character input frame information generating section and written in the first storage section.

Then, the traces of the handwriting input based on the trace coordinate data and the character recognized by the character recognizing section are displayed on the display panel by the display control section. Further, based on the character input frame information written in the first storage section, the character input frame is displayed on the display panel with the initial input position on the display panel used as a reference position.

Thus, the character input frame is automatically displayed in the position in which the operator performs handwriting.

Also, there is provided a device for inputting characters by handwriting in which trace coordinate data of a character is extracted by a character extracting section from trace coordinate data from an input section laminated on a display panel, and a height of a trace of the extracted character is normalized by a trace coordinate data normalizing section to thereby display on the display panel a trace of a handwriting input based on the trace coordinate data and the normalized trace by a display control section, comprising: a character input frame information generating section which generates character input frame information for displaying a character input frame representing a handwriting input area in an initial input position on the display panel and stores the information into a first storage section; the display control section displaying on the display panel the trace of the handwriting input and the normalized trace as well as the character input frame with the initial input position on the display panel used as a reference position based on the character input frame information stored in the first storage section.

According to the device, the trace coordinate data from the input section is transmitted to the character extracting section. Then, trace coordinate data of one character is extracted by the character extracting section and normalized by the trace coordinate data normalizing section. Further, based on the trace coordinate data from the input section, character input frame information is generated by the character input frame information generating section and written in the first storage section.

Then, the traces of the handwriting input based on the trace coordinate data and the traces normalized by the trace coordinate data normalizing section are displayed by the display control section. Further, based on the character input frame information written in the first storage section, the character input frame is displayed on the display panel with the initial input position on the display panel used as a reference position.

Thus, the character input frame is automatically displayed in the position in which the operator performs handwriting.

In an embodiment, the character input frame information generated by the character input frame information generating section is comprised of a character input frame display position that is the initial input position on the display panel, a number of cells constituting the character input frame and dimensions of the cells, and the display control section displays on the display panel the character input frame comprised of a series of cells continued in a direction based on the character input frame information with the cell that has said dimensions and is enclosing the reference position on the display panel used as a foremost cell.

In the embodiment, the character input frame information generating section generates character input frame information comprised of a character input frame display position that is the initial input position on the display panel, the number of cells constituting the character input frame and the dimensions of the cells. Then, the display control section displays the character input frame comprised of a series of cells continued in a direction based on the character input frame information with the cell having the dimensions and enclosing the reference position on the display panel used as the foremost cell.

Thus, the character input frame comprised of a series of a plurality of cells is displayed.

In an embodiment, the character input frame information generating section comprises a cell number calculating means for calculating a distance from the reference position to an end of a display area in said direction on the display panel based on the character input frame display position, and calculating the number of cells based on the distance and the dimensions of the cells.

In the embodiment, the cell number calculating means of the character input frame information generating section calculates the distance from the reference position to the end of the display area in the one direction on the display panel based on the character input frame display position, and calculates the number of cells based on the distance and the dimensions of the cells. Then, the character input frame information generating section writes the thus calculated number of cells into the first storage section as one of the character input frame information.

Thus, the character input frame comprised of the series of cells that continues from the initial input position to the end of the display area on the display panel is displayed.

In an embodiment, the character recognizing section is constructed so that, when character recognition is completed, it transmits recognition completion information representing completion of the character recognition to the character input frame information generating section, and the character input frame information generating section erases storage contents of the first storage section upon receiving the recognition completion information from the character recognizing section, and erases the character input frame displayed on the display panel.

In the embodiment, the character recognizing section transmits recognition completion information representing the completion of character recognition to the character input frame information generating section. Then, the character input frame information generating section erases the storage contents of the first storage section to erase the character input frame.

Thus, when the character recognition is completed, the character input frame is automatically erased.

In an embodiment, the trace coordinate data normalizing section is constructed so that, when normalization is completed, it transmits normalization completion information representing completion of the normalization to the character input frame information generating section, and the character input frame information generating section erases storage contents of the first storage section upon receiving the normalization completion information from the trace coordinate data normalizing section, and erases the character input frame displayed on the display panel.

In the embodiment, the trace coordinate data normalizing section transmits normalization completion information representing the completion of normalization to the character input frame information generating section. Then, the character input frame information generating section erases the storage contents of the first storage section to erase the character input frame.

Thus, when the normalization of the trace coordinate data is completed, the character input frame is automatically erased.

In an embodiment, the character input frame information generating section comprises handwriting input stop time counting means for counting a time elapsed from stopping of the handwriting input based on the trace coordinate data from the input section, and operates to erase storage contents of the first storage section when the handwriting input stop time reaches a specified time and erase the character input frame displayed on the display panel.

In the embodiment, the handwriting input stop time counting means of the character input frame information generating section counts the time elapsed from the stopping of the handwriting input based on the trace coordinate data. When the handwriting input stop time reaches a specified time, the character input frame information generating section erases the storage contents of the first storage section to erase the character input frame.

Thus, when the handwriting input has been stopped for the specified time, the character input frame is automatically erased.

In an embodiment, there is provided a second storage section which stores character code data of the character recognized by the character recognizing section, wherein the display control section displays the trace of the handwriting input based on the trace coordinate data from the input section, displays the character input frame based on the character input frame information written in the first storage section, and displays a printing type of the recognized character based on the character code data stored in the second storage section.

In the embodiment, the code data of the character recognized by the character recognizing section is stored in the second storage section. Then, the traces of the handwriting input are displayed by the display control section based on the trace coordinate data, the character input frame is displayed based on the character input frame information written in the first storage section, and the printing type of the recognized character are displayed based on the character code data stored in the second storage section.

Thus, the display of the traces of the handwriting input, the display of the character input frame and the display of the recognized character are executed without mutual interference based on the independently managed data.

In an embodiment, there is provided a second storage section which stores trace coordinate data normalized by the trace coordinate data normalizing section, wherein the display control section displays the trace of the handwriting input based on the trace coordinate data from the input section, displays the character input frame based on the character input frame information written in the first storage section, and displays a normalized trace based on the normalized trace coordinate data stored in the second storage section.

In the embodiment, the trace coordinate data normalized by the trace coordinate data normalizing section is stored in the second storage section. Then, the traces of the handwriting input are displayed by the display control section based on the trace coordinate data, the character input frame is displayed based on the character input frame information written in the first storage section, and the normalized traces are displayed based on the normalized trace coordinate data stored in the second storage section.

Thus, the display of the traces of the handwriting input, the display of the character input frame and the display of the normalized traces are executed without mutual interference based on the independently managed data.

Furthermore, in an embodiment, the character input frame is displayed only by line segments that form the frame of the character input frame based on the character input frame information by the display control section.

Thus, even when the character input frame is displayed on already displayed printing types, figures and ruled lines, the character input frame is displayed so that it does not hide those images.

In an embodiment, there is provided a handwriting input validity deciding section which sets a valid area for validating the handwriting input around the character input frame based on the character input frame information generated by the character input frame information generating section, and decides that the trace coordinate data is valid when a foremost trace coordinate data of a series of trace coordinate data from the input section exists in the character input frame or a valid area, or decides that the trace coordinate data is invalid when the foremost trace coordinate data do not exist in the character input frame or the valid area, and transmits valid/invalid information representing a result of decision to the character extracting section, wherein the character extracting section extracts only the trace coordinate data of the character constituted by the trace coordinate data that is decided to be valid based on the valid/invalid information from the handwriting input validity deciding section.

In the embodiment, the handwriting input validity deciding section sets a valid area around the character input frame based on the input frame information. Then, it is decided whether or not the foremost trace coordinate data of the series of continuous trace coordinate data from the coordinate input section exists in the character input frame or the valid area and consequently the data is valid, and the valid/invalid information representing the result of the decision is transmitted to the character extracting section. Then, the character extracting section executes character extraction based on only the trace coordinate data that has been decided to be valid according to the valid/invalid information.

Thus, even when the head of the handwriting input traces is jutting out of the character input frame to some extent, the handwriting input is decided to be valid and the character extraction/recognition is executed.

In an embodiment, there is provided a handwriting input validity deciding section which sets a valid area for validating the handwriting input around the character input frame based on the character input frame information generated by the character input frame information generating section, and decides that the trace coordinate data is valid when whole data of a series of trace coordinate data from the input section exists in the character input frame or the valid area, or decides that the trace coordinate data is invalid when a portion of the trace coordinate data exists in neither the character input frame nor the valid area, and transmits valid/invalid information representing a result of decision to the character extracting section, wherein the character extracting section extracts only the trace coordinate data of the character constituted by the trace coordinate data that is decided to be valid based on the valid/invalid information from the handwriting input validity deciding section.

In the embodiment, the handwriting input validity deciding section sets a valid area around the character input frame based on the input frame information. Then, it is decided whether or not the whole continuous trace coordinate data from the coordinate input section exists in the character input frame or the valid area and consequently the data is valid, and the valid/invalid information representing the result of the decision is transmitted to the character extracting section. Then, the character extracting section executes character extraction based on only the trace coordinate data that has been decided to be valid according to the valid/invalid information.

Thus, the handwriting input traces jutting out of the character input frame to some extent are decided to be valid and the character extraction/recognition is executed.

In an embodiment, there is provided a character input frame renewing section which sets an area of the character input frame based on the character input frame information generated by the character input frame information generating section, and upon detecting that the trace coordinate data from the input section jumps from said area to the outside of said area, transmits character input frame renewal information for designating renewal of a currently displayed character input frame to the character input frame information generating section, wherein the character input frame information generating section generates character input frame information based on the trace coordinate data inputted to the outside of said area from the input section and renews contents of the first storage section upon receiving the character input frame renewal information before it receives recognition completion information from the character recognizing section.

In an embodiment, there is provided a character input frame renewing section which sets an area of the character input frame based on the character input frame information generated by the character input frame information generating section, and upon detecting that the trace coordinate data from the input section jumps from said area to the outside of said area, transmits character input frame renewal information for designating renewal of a currently displayed character input frame to the character input frame information generating section, wherein the character input frame information generating section generates character input frame information based on the trace coordinate data inputted to the outside of said area from the input section and renews contents of the first storage section upon receiving the character input frame renewal information before it receives normalization completion information from the trace coordinate data normalizing section.

In the embodiments, the character input frame renewing section sets an area of the character input frame based on the character input frame information. Then, upon detecting that the trace coordinate data jumps from inside the area to the outside of the area, the character input frame renewal information is transmitted to the character input frame information generating section. Then, the character input frame information generating section generates character input frame information based on the coordinate input position information relevant to the trace coordinate data inputted to the outside of the area and renews the contents of the first storage section before it receives the recognition completion information or the normalization completion information.

Thus, when a handwriting input is performed outside the displayed character input frame, the displayed character input frame is automatically moved to a new input position.

In an embodiment, there is provided a character input frame size designating section for designating a size of the character input frame; and a dimension information storing section for storing therein dimension information of the character input frame corresponding to the size of the character input frame, wherein the character input frame information generating section is constructed so that it reads from the dimension information storing section the dimension information of the character input frame corresponding to the size of the character input frame designated by the character input frame size designating section, and writes the dimension information and the character input frame information into the first storage section, and the display control section displays on the display panel the character input frame corresponding in size to the dimension information based on the character input frame information and the dimension information written in the first storage section.

In the embodiment, when the size of the character input frame is designated by the character input frame size designating section, the character input frame information generating section reads the dimension information of the character input frame corresponding to the size of the designated character input frame from the dimension information storing section. Then, the dimension information and the character input frame information are written into the first storage section. Then, the display control section displays the character input frame corresponding in size to the dimension information on the display panel based on the character input frame information and the dimension information written in the first storage section.

Thus, the character input frame of which size has been preparatorily designated by the operator is displayed in a popping-up manner on the display panel.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 11 is a flowchart of a character input frame displaying operation in which a character input is automatically erased when a handwriting character input has been stopped for a specified time and character recognition is completed;

FIG. 14 is an explanatory view of a valid area different from that of FIG. 13;

DETAILED DESCRIPTION OF THE PREFERRED EMBODIMENTS

The present invention will be described below based on embodiments thereof with reference to the accompanying drawings.

First Embodiment

Figure 1:
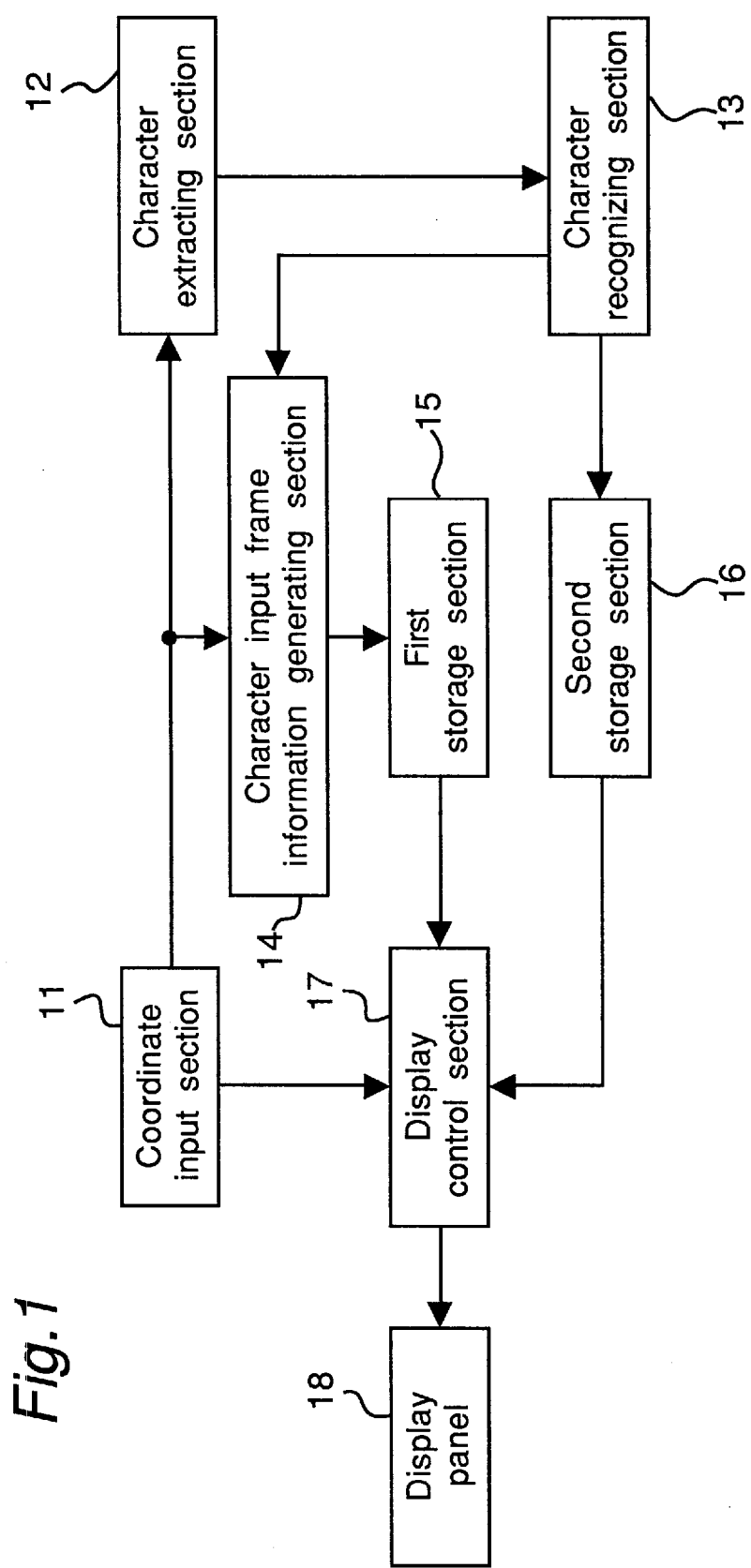
FIG. 1 is a block diagram of a device for inputting characters by handwriting according to an embodiment of the present invention.

FIG. 1 is a block diagram of a device for inputting characters by handwriting according to the first embodiment.

A coordinate input section 11 temporarily stores series data of input coordinate values on a transparent tablet (not shown) transmitted from an input unit (not shown) including the transparent tablet laminated on a display panel 18 comprised of a liquid crystal display panel or the like as a handwritten character trace data into an internal memory (not shown) thereof. Then, the series data of the input coordinate values (referred to as trace coordinate data hereinafter) is transmitted as image data to be recognized to a data processing system in a subsequent stage. Further, presence/absence information of the coordinate input, coordinate input position information and input time information are transmitted to a character input frame information generating section 14. Further, the trace coordinate data is directly transmitted as handwritten character trace data to a display control section 17.

A character extracting section 12 extracts image data corresponding to one character from image data of a character or a string of characters transmitted from the coordinate input section 11. Then, a character recognizing section 13 recognizes the character represented by the image data of one character extracted by the character extracting section 11, and when the recognition is completed, it transmits recognition completion information to the character input frame information generating section 14.

The character input frame information generating section 14 operates, based on the presence/absence information of the coordinate input, the coordinate input position information and the input time information transmitted from the coordinate input section 11 and the recognition completion information transmitted from the character recognizing section 13, to write or erase the character input frame information comprised of display position data of the character input frame to be displayed on the display panel 18 (the data referred to as frame display position data hereinafter), and the number of cells constituting the character input frame in a first storage section 15 to thereby control displaying/erasing of the character input frame.

The first storage section 15 stores the character input frame information from the character input frame information generating section 14. Meanwhile, a second storage section 16 stores character code data of the character recognized by the character recognizing section 13. The second storage section 16 further stores image data of established images such as figures and ruled lines.

The display control section 17 displays on the display panel 18, printing types, figures and ruled lines based on the character code data and the image data stored in the second storage section 16, a character input frame based on the character input frame information stored in the first storage section 15 and the traces of the handwritten character based on the trace coordinate data from the coordinate input section 11.

In the above place, the character code data of the character and the established image data such as the figures and ruled lines recognized by the character recognizing section 13 are stored in the second storage section 16. In contrast to the above, the character input frame information based on the coordinate input position information of the traces of the current handwritten input is stored in the first storage section 15, and is managed independently of the character code data and the established image data. Therefore, even when an input character is written by a pen on the printing types, figures and ruled lines which are already displayed, only the series data of the input coordinate values relevant to the subsequently written characters can be stored as trace coordinate data, meaning that the extraction of characters by the character extracting section 12 and the character recognition by the character recognizing section 13 are executed without hindrance.

Next, the character input frame information outputted from the character input frame information generating section 14 will be described in detail.

Figure 2:
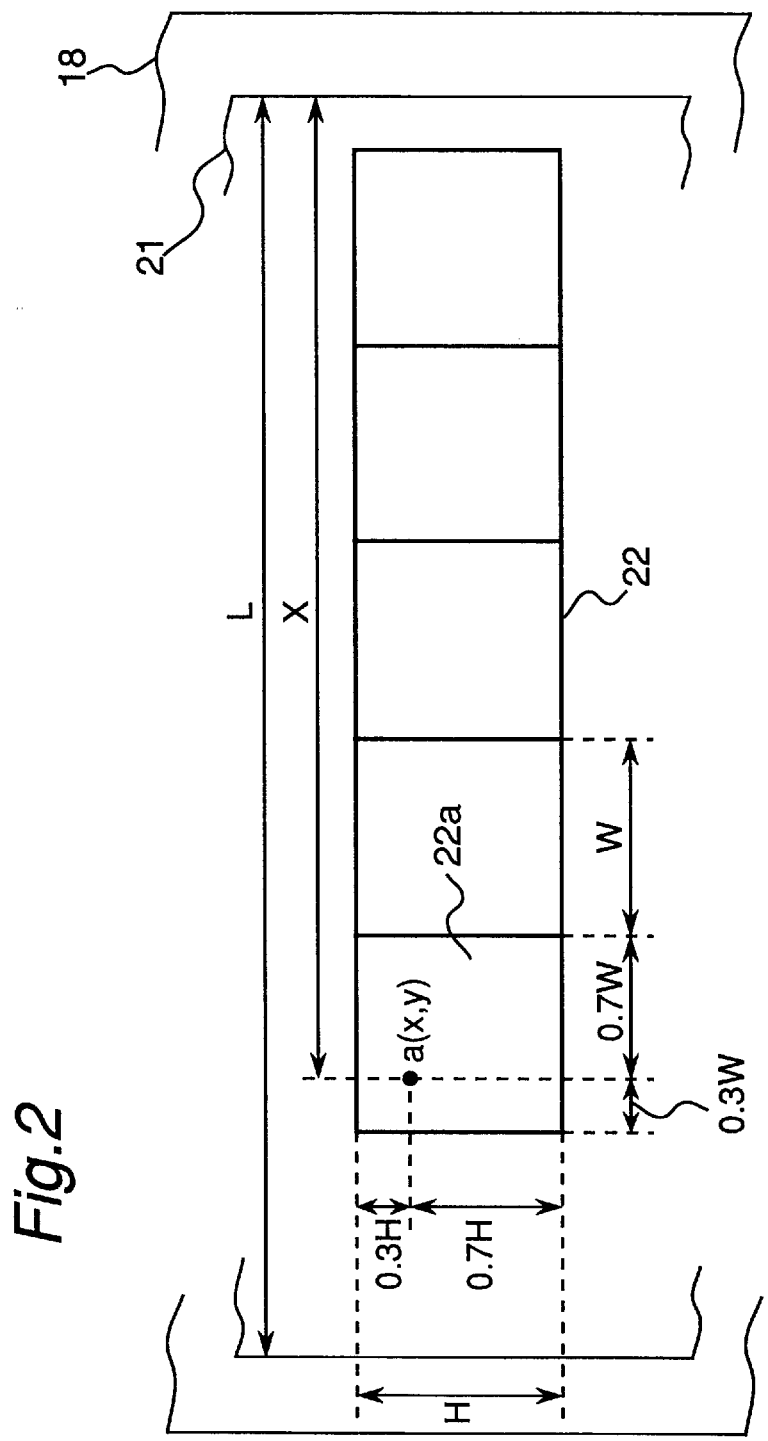
FIG. 2 is a view of an exemplified state in which a character input frame is displayed on a display panel shown in FIG. 1.

FIG. 2 shows an exemplified state in which a character input frame 22 is displayed in a display area 21 on the display panel 18.

The character input frame information generating section 14 firstly obtains coordinates (x,y) of an input position "a" on the display area 21 corresponding to a position in which the pen is initially put in contact with the transparent tablet based on the coordinate input position information transmitted from the coordinate input section 11, and uses the coordinates as the "frame display position data". Then, according to the frame display position data (x,y) and a value "L" of the width of the display area 21, the number N of the cells constituting the character input frame 22 is calculated by the following expressions. In the above stage, it is assumed that a point for interiorly dividing the width and the height of the first (leftmost) cell 22a constituting the character input frame 22 respectively at a ratio of 3:7 and at a ratio of 7:3 is located in the place of the input position "a".

$X = L - x$ $N_0 \leq \{(X - 0.7 \ W/W\} + 1$

N=a maximum value from among integers $N_0$ satisfying the above expression provided that W is the width of a cell, and H is the height of the cell.

Next, the thus obtained frame display position data (x,y), the number N of the cells, the cell width W and the cell height H are transmitted as the character input frame information to the first storage section 15. Then, the display control section 17 displays the first cell 22a so that the input position "a (x,y)" becomes the point for interiorly dividing the width W and the height H of the first cell 22a respectively at a ratio of 3:7 and at a ratio of 7:3. Then, by displaying (N-1) cells continuously rightward from the first cell 22a, the character input frame 22 is displayed.

Thus, the character input frame 22 of the present embodiment is displayed with the input position "a" on the display panel 18 corresponding to the position in which the pen is initially put in contact with the transparent tablet used as reference coordinates. Therefore, the operator can perform handwriting character input by automatically displaying the character input frame 22 in a position in which the operator desires to write a character on the transparent tablet laminated on the display panel 18.

Figure 3:
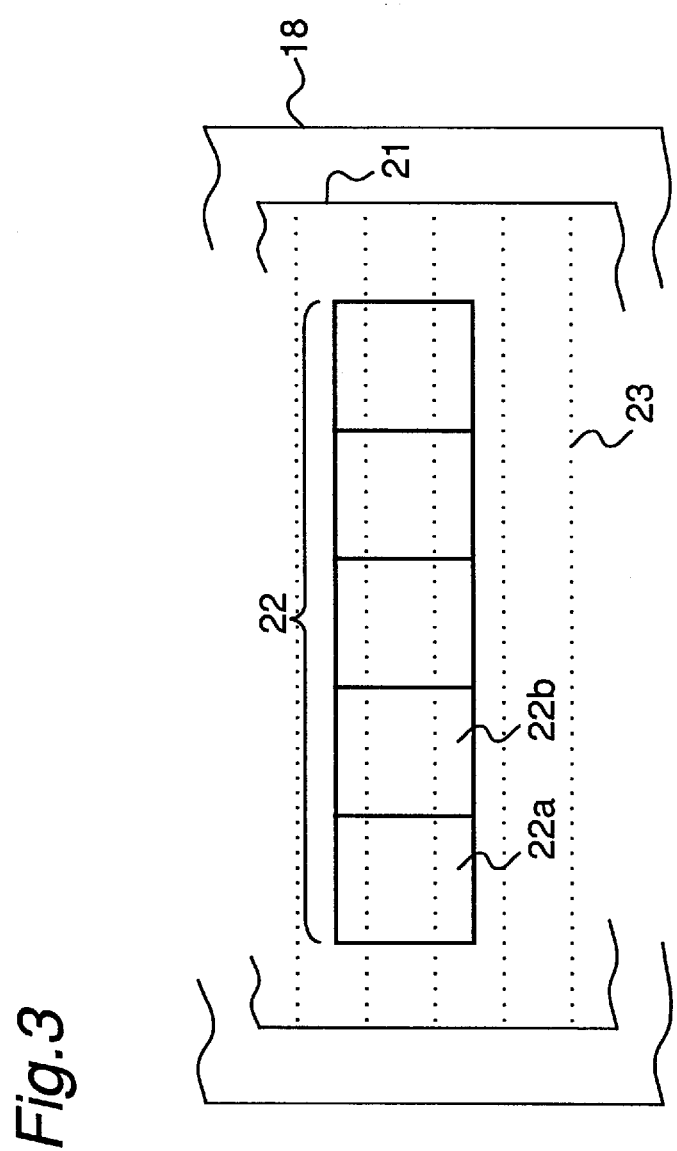
FIG. 3 is an explanatory view of a characteristic of the character input frame.

Furthermore, as described above, the character input frame 22 displayed on the display panel 18 by the display control section 17 is a simply displayed frame composed of only its frame including neither an inserting button for inserting the character recognized by the character recognizing section 13 into a displayed composition nor an operating button for designating an insertion position of the character as shown in FIG. 3. Therefore, the character input frame 22 can be set by effectively using the full space on the right side of the initial input position "a" on the display area 21.

Furthermore, the character input frame 22 is comprised of only line segments for showing the frame, and therefore the cells 22a, 22b, . . . are internally transparent. Therefore, even when the character input frame 22 overlaps on an already displayed image such as previously inputted characters, figures and preset ruled lines 23, those already displayed images are displayed inside the cells 22a, 22b, . . . to be perceivable.

The device for inputting characters by handwriting having the above-mentioned construction operates as follows.

Figure 4:
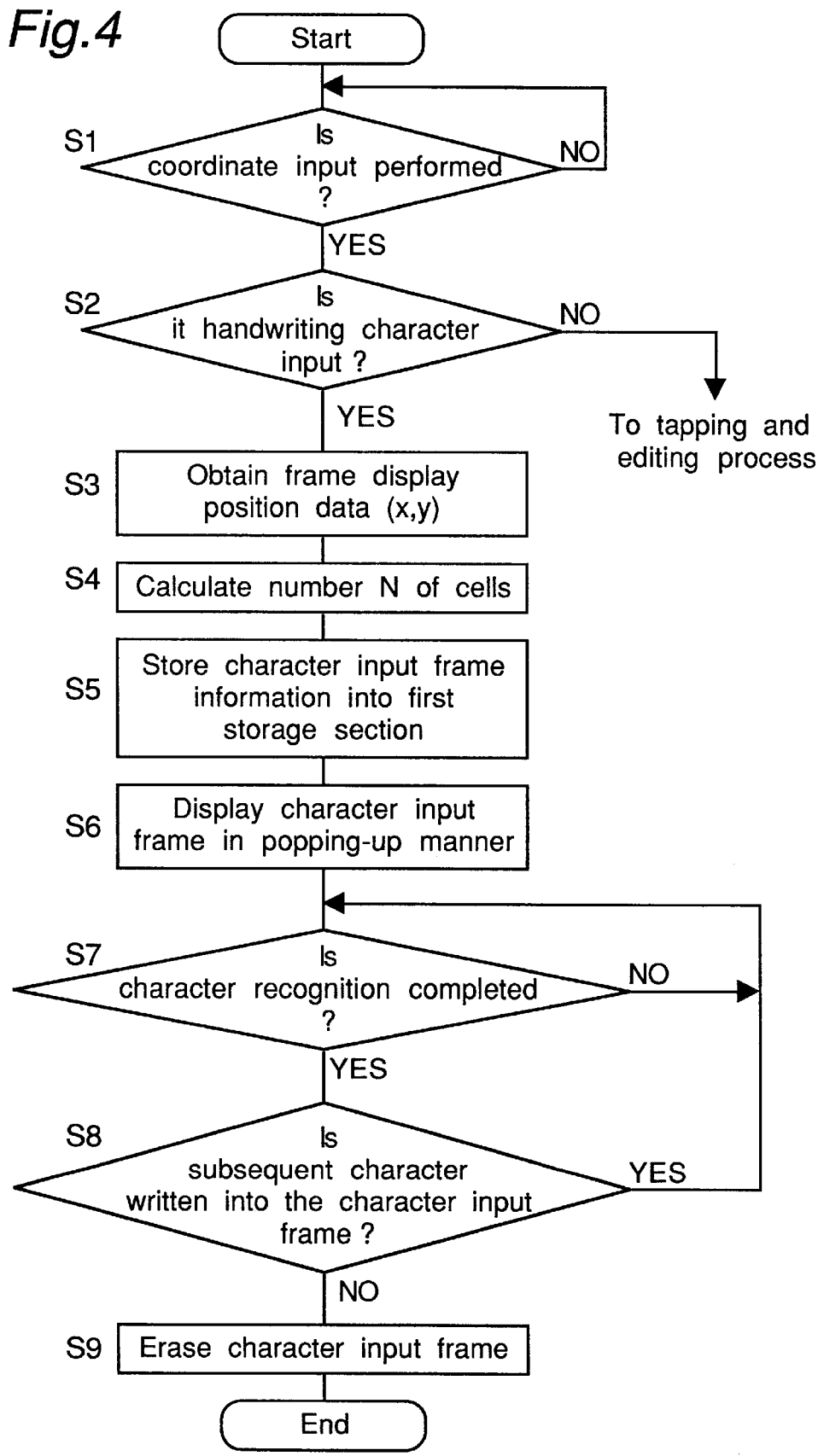
FIG. 4 is a flowchart of a character input frame displaying operation executed by a coordinate input section, a character input frame information generating section and a display control section shown in FIG. 1.

FIG. 4 is a flowchart of a character input frame displaying operation executed by the coordinate input section 11, the character input frame information generating section 14 and the display control section 17. The character input frame displaying operation will be described below with reference to FIG. 4.

In step S1, the coordinate input section 11 decides whether or not a coordinate input is performed by the pen or the like on the transparent tablet based on the trace coordinate data from the input unit, and the presence/absence data of the coordinate input is outputted. When the coordinate input is performed, the program flow proceeds to step S2.

In step S2, the character input frame information generating section 14 decides whether the coordinate input in step S1 is trace coordinate data of a handwriting character input by the pen or an editing gesture such as tapping, erasing, and line starting by the pen based on the coordinate input position information from the coordinate input section 11. When the input is a handwriting character input, the program flow proceeds to step S3. Otherwise, the program flow proceeds to the tapping or editing process.

In step S3, a frame display position data (x,y) representing the coordinates of the initial input position "a" on the display panel 18 is obtained by the character input frame information generating section 14 based on the coordinate input position information from the coordinate input section 11.

In step S4, the number N of the cells is calculated in a manner as described above by the character input frame information generating section 14 based on the frame display position data (x,y).

In step S5, the obtained frame display position data (x,y), number N of the cells, cell width W and cell height H are outputted by the character input frame information generating section 14, and then stored in the first storage section 15.

In step S6, the character input frame information comprised of the frame display position data (x,y), number N of the cells, cell width W and cell height H are read from the first storage section 15 by the display control section 17. With the coordinates (x,y) represented by the frame display position data used as reference coordinates, the character input frame 22 comprised of a series of cells in which the cell enclosing the coordinates (x,y) is made to serve as the first cell 22a is displayed in a popping-up manner on the display panel 18.

When the character input frame 22 is thus displayed, a handwriting character is inputted in the character input frame 22, and the image data of a character or a string of characters is transmitted from the coordinate input section 11 to the character extracting section 12. Then, image data corresponding to one character is extracted by the character extracting section 12, and character recognition is executed by the character recognizing section 13 based on the image data of one character.

In step S7, the character input frame information generating section 14 decides whether or not the character recognition for the character written in the character input frame 22 displayed in step S3 is completed based on the recognition completion information from the character recognizing section 13. When the character recognition is completed, the program flow proceeds to step S8.

In step S8, the character input frame information generating section 14 decides whether or not a subsequent character is written in the character input frame 22 based on the coordinate input position information and the character input frame information from the coordinate input section 11. Consequently, when no subsequent character is written in the frame, the program flow proceeds to step S9. When a subsequent character is written in the frame, the program flow returns to step S7 to display the character input frame 22 until no character is subsequently written in the character input frame 22.

In step S9, the character input frame information stored in the first storage section 15 is erased by the character input frame information generating section 14. Consequently, the display control section 17 stops displaying the character input frame based on the character input frame information and stops displaying the input traces based on the trace coordinate data from the coordinate input section 11. Then, the character code data of the character recognized by the character recognizing section 13 is read from the second storage section 16 and displayed in a printing type form in the position of the reference coordinates in step S3.

Thus, when the character input frame 22 is erased, the character input frame displaying operation ends.

FIGS. 5A through 5E show a character input frame displaying procedure through the character input frame display processing.

Figure 5A:
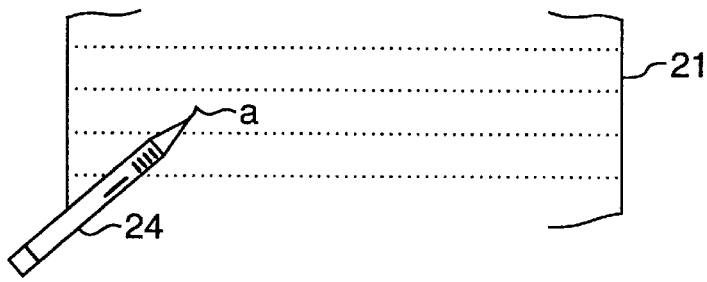
FIGS. 5A through 5E are views showing a character input frame displaying procedure through the character input frame display processing shown in FIG. 4.

The operator starts to write a handwriting character by means of a pen 24 in a position in which the operator desires to write the character on the transparent tablet (FIG. 5A).

Figure 5B:
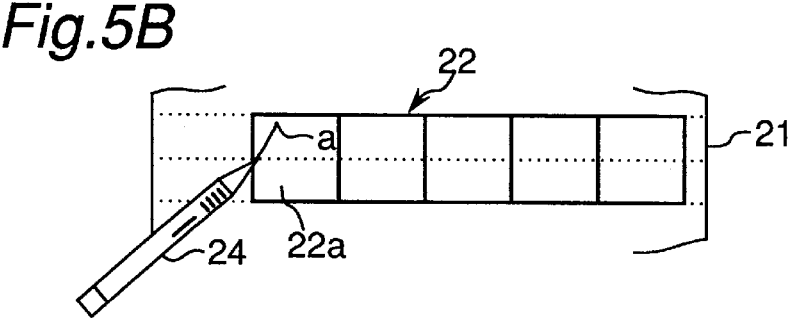

It is decided that there are trace coordinate data of a handwriting character input based on the coordinates of the initial contact position. Consequently, the character input frame 22 comprised of a series of cells continued rightward from the first cell 22a enclosing the input position "a" on the display panel 18 is displayed in a popping-up manner (FIG. 5B).

Figure 5C:
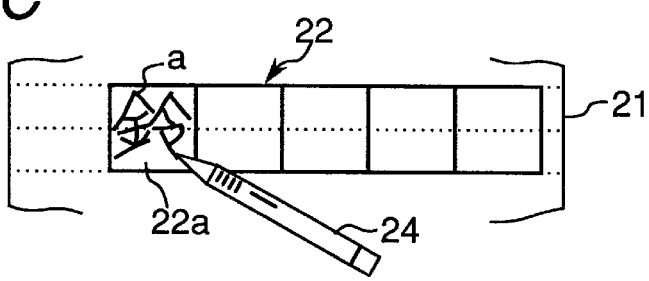
Figure 5D:
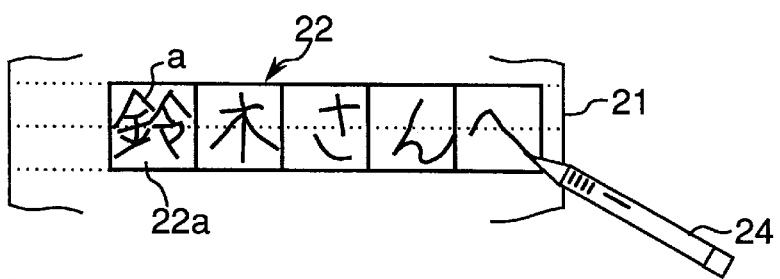

Handwriting Chinese characters as shown in FIGS. 5C and 5D are successively inputted to the displayed character input frame 22, and the character input frame 22 is continuously displayed during the time (FIGS. 5C and 5D).

Figure 5E:
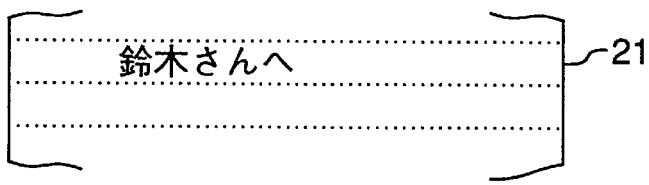

When no subsequent character is inputted after the handwriting character input is completed and the characters are extracted and recognized, the character input frame 22 and the input traces are erased, and the result of character recognition is displayed in the printing type form (FIG. 5E).

Thus, the character input frame 22 and the input traces are automatically erased.

FIGS. 6A, 6B, 7A and 7B show other display examples of the character input frame.

Figure 6A:
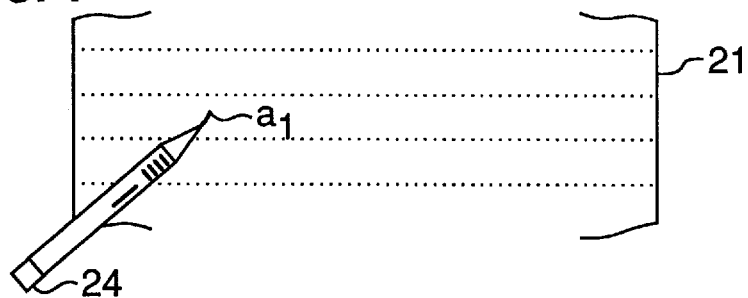
FIGS. 6A and 6B are views showing a display example of the character input frame.
Figure 6B:
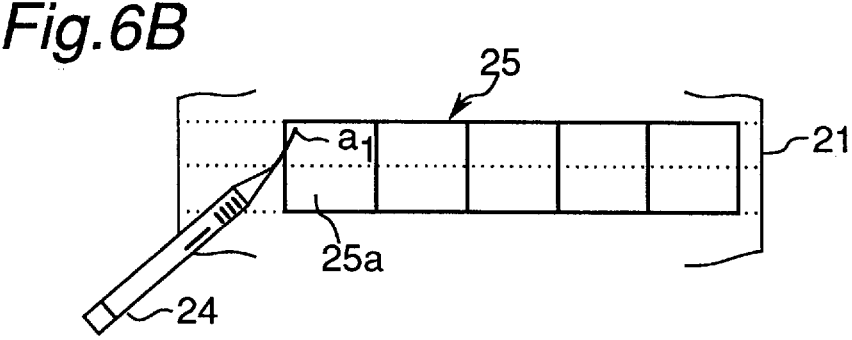

FIGS. 6A and 6B show a display example in which the operator starts to write a character from the left-hand side of the transparent tablet.

The operator starts to write a handwriting character by means of the pen 24 from a left-hand position $a_1$ on the display area 21 of the display panel 18 (FIG. 6A).

A character input frame 25 comprised of a series of cells of the number N=5 continued rightward from a cell 25a enclosing the initial input position "$a_1$" is displayed in a popping-up manner (FIG. 6B).

Figure 7A:
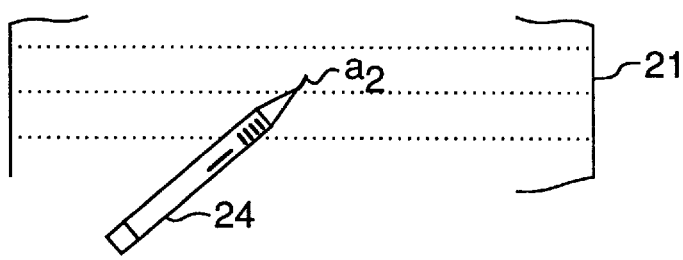
FIGS. 7A and 7B are views showing a display example of a character input frame different from the character input frame of FIGS. 6A and 6B.
Figure 7B:
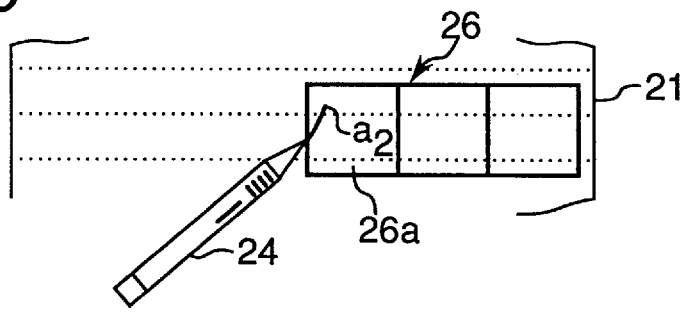

FIGS. 7A and 7B show a display example in which the operator starts to write a character from a center position of the transparent tablet.

The operator starts to write a handwriting character by means of the pen 24 in a center position $a_2$ on the display area 21 of the display panel 18 (FIG. 7A).

A character input frame 26 comprised of a series of cells of the number N=3 continued rightward from a cell 26a enclosing the initial input position "$a_2$" is displayed in a popping-up manner. In the present case, the input position $a_2$ is located in the center position, and therefore a value of a distance X (refer to FIG. 2) from the input position $a_2$ to the right end of the display area 21 is smaller than that in the case of FIGS. 6A and 6B in which the input position is located at the left-hand side, resulting in a smaller value of the number N of the cells (FIG. 7B).

Thus, whatever position the operator starts from to write a character on the transparent tablet, a character input frame comprised of a series of cells having a specified size continued rightward from the position is displayed.

FIGS. 8A through 8D show another displaying procedure of the character input frame.

Figure 8A:
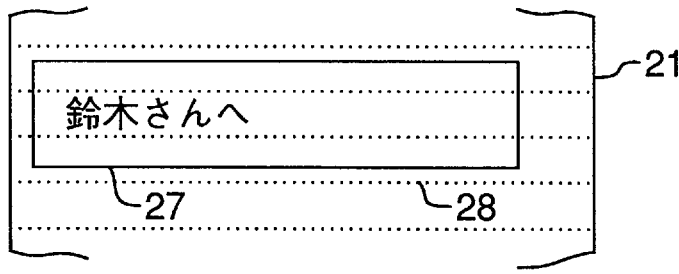
FIGS. 8A through 8D are views showing a character input frame displaying procedure different from that of FIG. 5.
Figure 27:
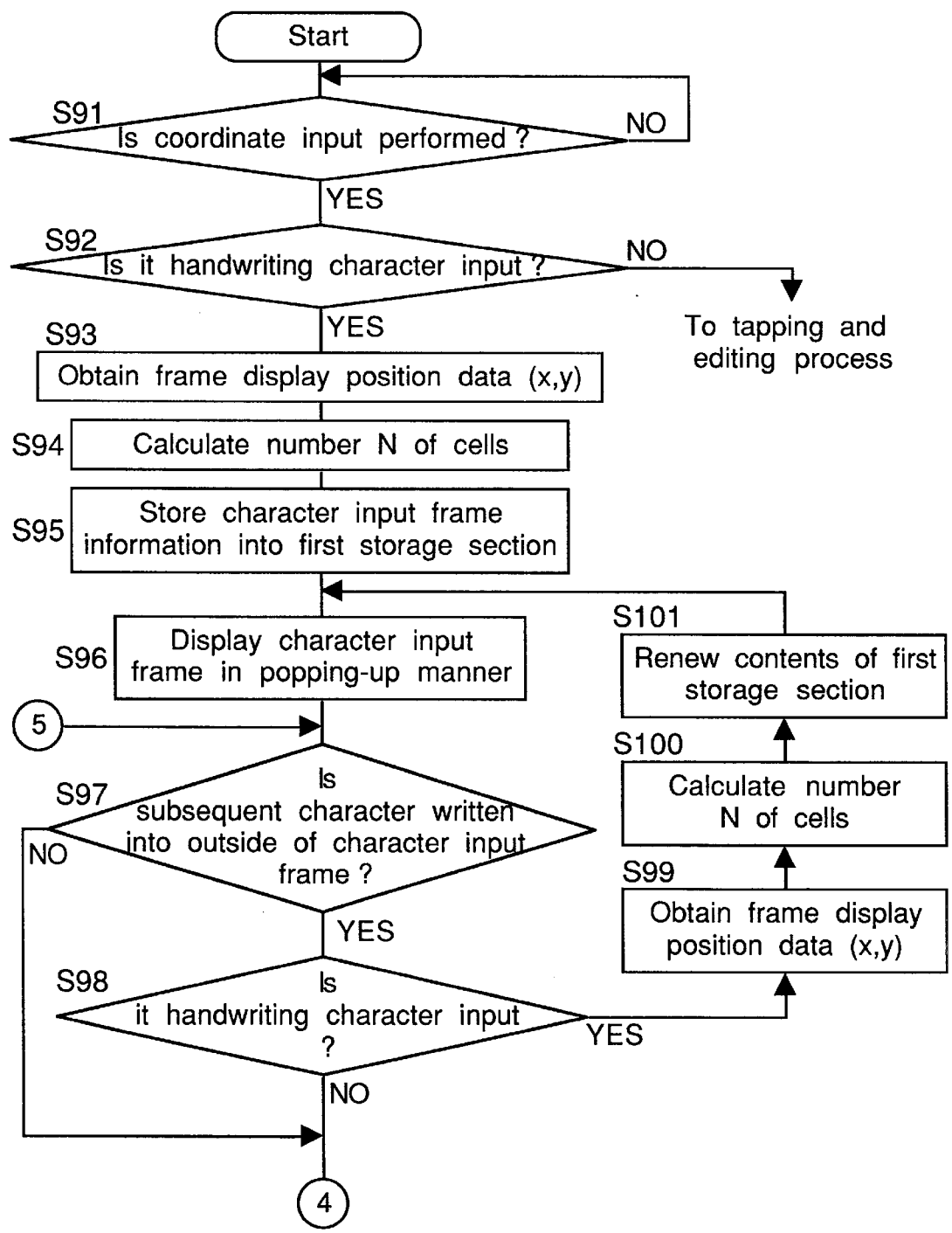
FIG. 27 is a flowchart of a character input frame displaying/renewing operation in which a character input is automatically erased when a handwriting character input has been stopped for a specified time and character recognition is completed.

On the display area 21 of the display panel 18, there are shown the recognized string of printing types of Chinese characters and Japanese characters called "Hiragana" in Japanese, a square FIG. 27 enclosing the string of the printing types and ruled lines 28. In the present state, the character input frame is not displayed yet (FIG. 8A).

Figure 8B:
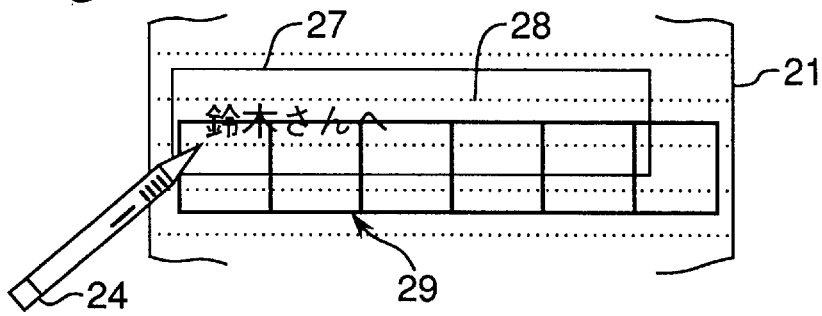
Figure 8C:
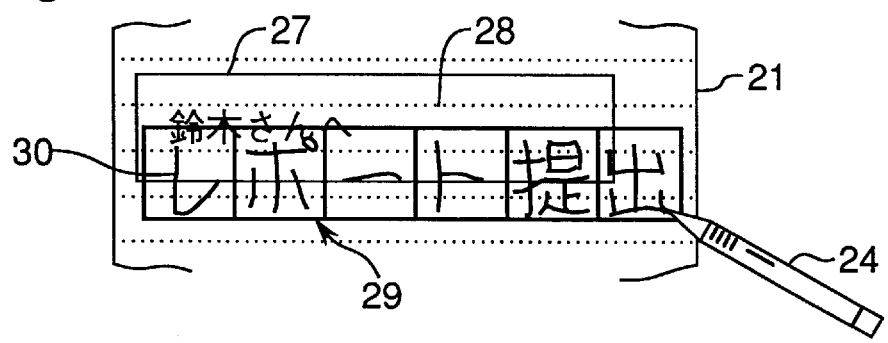

Upon starting a handwriting character input on the printing type of the Chinese characters, a character input frame 29 is displayed in a popping-up manner. In this stage, the character input frame 29 is composed of only the frame and its inside is transparent, and therefore the already displayed string of printing types of the Chinese characters and Hiraganas, FIG. 27 and ruled lines 28 which are already displayed are displayed without being hidden. Further, as described above, the trace coordinate data, character input frame information, character code data and established image data are managed mutually independently. Therefore, the string of printing types of Chinese characters and Hiraganas FIG. 27, ruled lines 28, character input frame 29 and input traces 30 are displayed without mutual interference (FIGS. 8B and 8C).

Figure 8D:
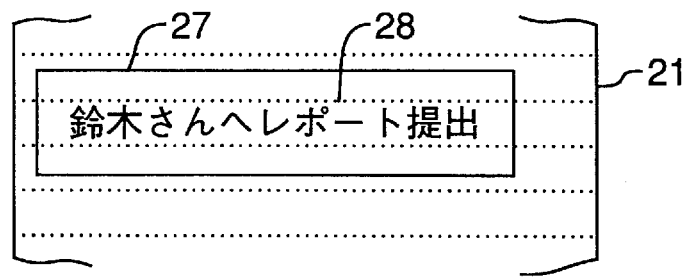

Upon completing the handwriting character input and erasing the character input frame 29 and the input traces 30, then the string of printing types of a result of character recognition (Japanese characters called "Katakana" in Japanese and Chinese characters) is displayed continuously from the tail of the already displayed string of the Chinese characters and Hiraganas (FIG. 8D).

Thus, the character input frame 29 and the input traces 30 are displayed without interfering with the string of printing types, FIG. 27 and ruled lines 28.

As described above, in the present embodiment, upon the occurrence of a coordinate input by a handwriting character based on the coordinate input presence/absence information and the coordinate input position information from the coordinate input section 11, then the character input frame information is generated by the character input frame information generating section 14 and stored into the first storage section 15. Then, the character input frame information is read from the first storage section 15 by the display control section 17. With the coordinates represented by the frame display position data of the character input frame information used as the reference coordinates, the character input frame 22 is displayed in a popping-up manner fully on the right end of the display area 21 on the right-hand side of the reference coordinates on the display panel 18.

Therefore, according to the present embodiment, the character input frame 22 is displayed in the position in which the operator desires to effect an input (i.e., in the position in which the operator has started writing the character) on the transparent tablet, and the printing type of the result of recognition is displayed.

Furthermore, when a character is written in the character input frame 22, the extraction and recognition are automatically executed. When the character recognition is completed and no subsequent handwriting character input occurs, the character input frame information in the first storage section 15 is erased by the character input frame information generating section 14, and the displaying of the character input frame 22 is automatically stopped to display the result of recognition in the printing type form.

In the above case, the character extraction by the character extracting section 12 and the character recognition by the character recognizing section 13 are executed based on the image data from the coordinate input section 11 independently of the display processing system of the character input frame 22. Therefore, even when an input character is written by the pen on the already displayed printing types, figures and ruled lines, the above operation is executed without hindrance.

In other words, according to the present embodiment, the character input frame 22 is automatically displayed or erased in the position in which the operator has started writing the character, and the printing type of the result of recognition is automatically displayed in the input position. Therefore, it is not required to give any command for the character input frame displaying/erasing operation, the character recognizing operation and the like, meaning that natural note-taking can be achieved.

In the character input frame displaying operation executed by the coordinate input section 11, the character input frame information generating section 14 and the display control section 17 in the above description, the character input frame is erased when the character recognition for the written character is completed and no subsequent character is written. However, the character input frame can be automatically erased when the handwriting character input has been stopped for a specified time as follows.

Figure 9:
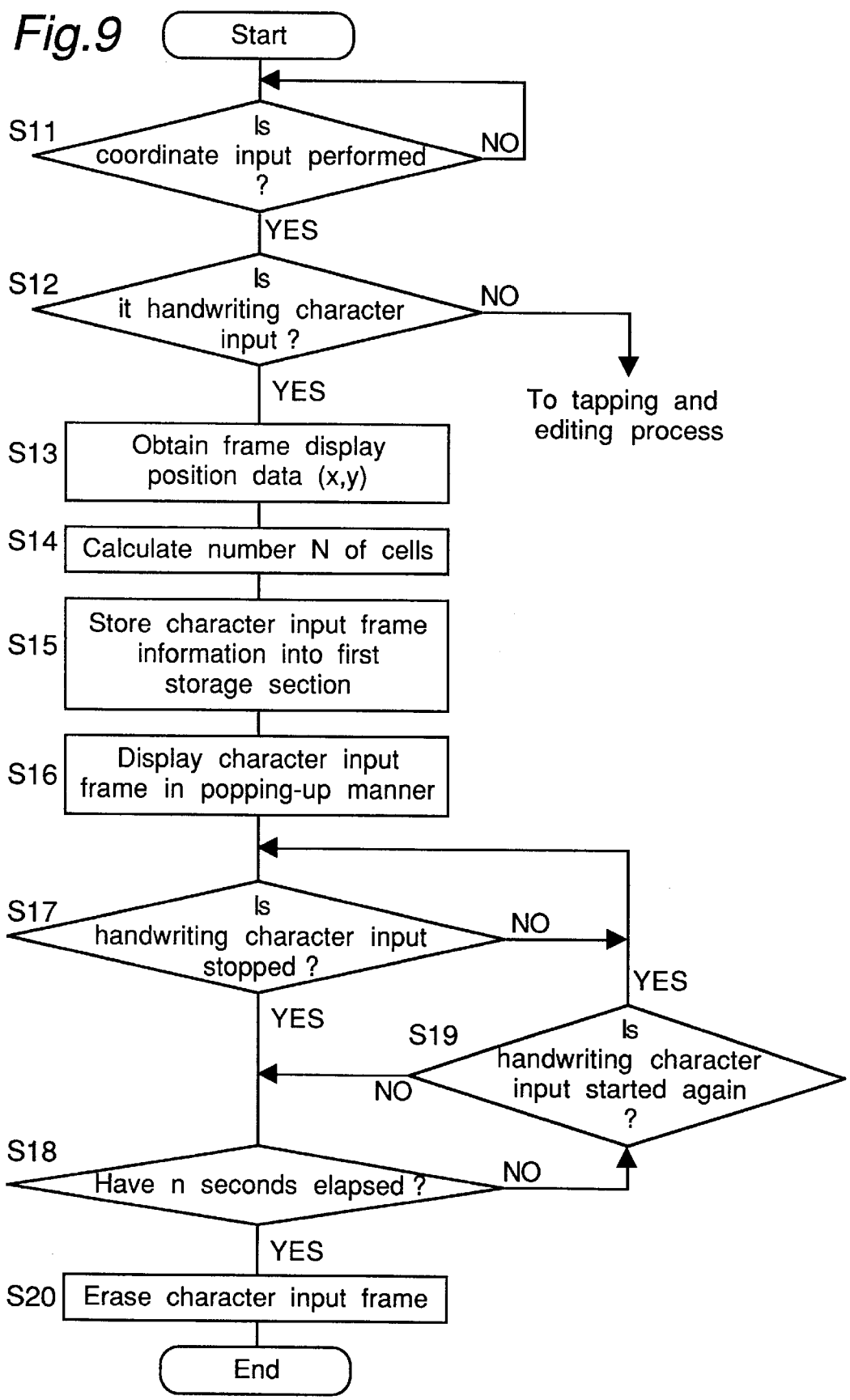
FIG. 9 is a flowchart of a character input frame displaying operation in which a character input is automatically erased when a handwriting character input has been stopped for a specified time.

FIG. 9 is a flowchart of the character input frame displaying operation in which the character input frame is automatically erased when the handwriting character input has been stopped for a specified time. The character input frame displaying operation will be described below with reference to FIG. 9.

In steps S11 through S16, when a handwriting character is inputted as a coordinate input on the transparent tablet, a character input frame is displayed in a popping-up manner fully on the right-hand side of the display panel 18 with the coordinates represented by the frame display position data stored in the first storage section 15 used as the reference coordinates similarly to steps S1 through S6 of the flowchart of the character input frame displaying operation shown in FIG. 4.

In step S17, stoppage of handwriting character input is monitored by character input frame information generating section 14 based on the presence/absence information of the coordinate input from the coordinate input section 11. When the handwriting character input has been stopped, the program flow proceeds to step S18.

In step S18, the character input frame information generating section 14 decides whether or not n seconds have elapsed from the stoppage of the handwriting character input based on the presence/absence information of the coordinate input and the input time information from the coordinate input section 11. Consequently, when n seconds have elapsed, the program flow proceeds to step S20. When n seconds have not elapsed, the program flow proceeds to step S19.

In step S19, the character input frame information generating section 14 decides whether or not the handwriting character input is started again based on the presence/ absence information of the coordinate input. Consequently, when the handwriting character input is started again, the program flow returns to step S17 to monitored stoppage of the handwriting character input. When the handwriting character input is not started again, the program flow returns to step S18 to continue counting the handwriting character input stop time.

In step S20, the character input frame is erased in the same manner as in step S9 of the flowchart of the character input frame displaying operation shown in FIG. 4.

Subsequently, the character extraction by the character extracting section 12 and the character recognition by the character recognizing section 13 are executed, and the result of recognition is displayed in the form of printing types in the position of the reference coordinates on the display panel 18.

Thus, when the character input frame is erased, the character input frame displaying operation ends.

FIGS. 10A through 10F show a display example of the character input frame through the character input frame display processing shown in FIG. 9.

Figure 10A:
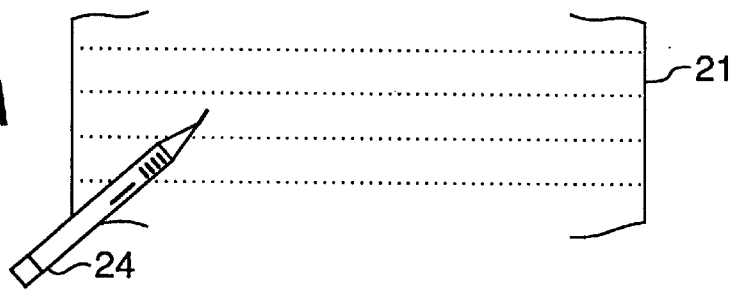
FIGS. 10A through 10F are views of a display example of the character input frame through the character input frame display processing shown in FIG. 9.

The operator starts to write a handwriting character by means of the pen 24 in a position in which the operator desires to write the character on the transparent tablet (FIG. 10A).

Figure 10B:
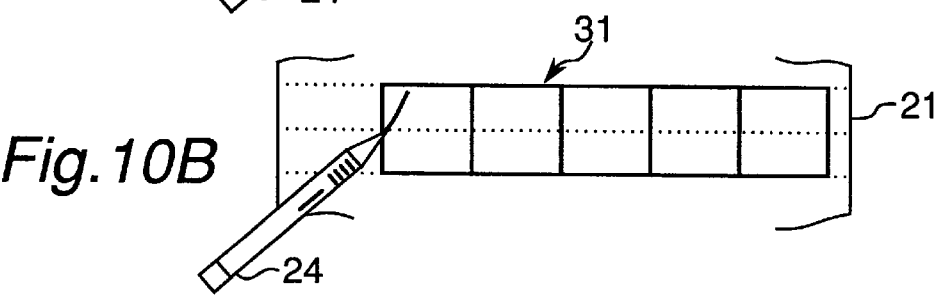

It is decided that the input is trace coordinate data of a handwriting character based on the coordinates of an initial contact position. Consequently, a character input frame 31 comprised of a series of cells continued rightward from the cell enclosing the reference coordinates on the display panel 18 based on the contact position is displayed in a popping-up manner (FIG. 10B).

Figure 10C:
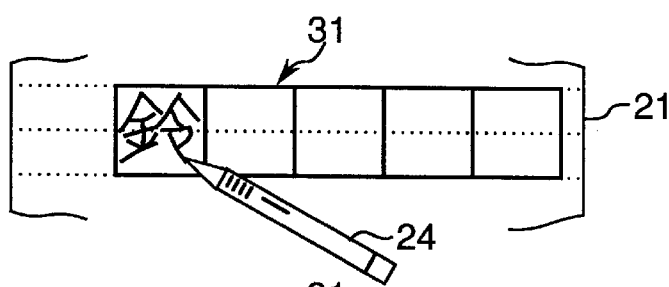
Figure 10D:
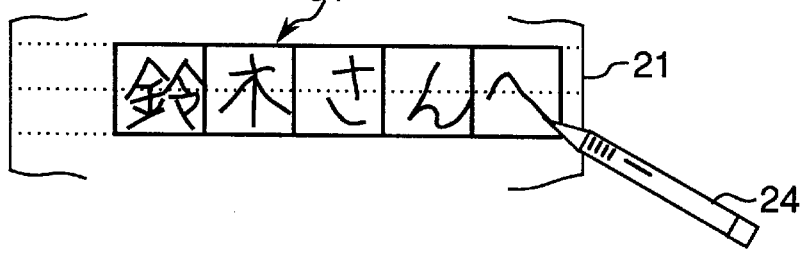

Handwriting Chinese characters and Hiraganas are successively inputted to the displayed character input frame 31, and the character input frame 31 is continuously displayed during the time (FIGS. 10C and 10D).

Figure 10E:
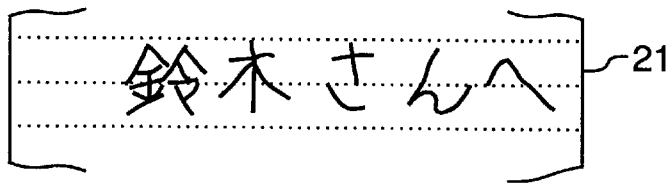

Upon detecting the handwriting character input having been stopped for n seconds, the character input frame 31 and the input traces are erased (FIG. 10E).

Figure 10F:
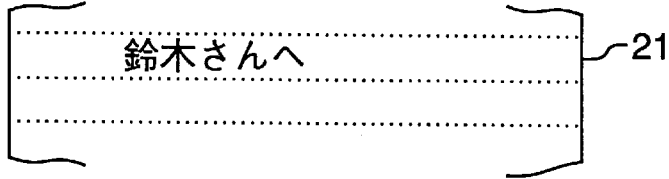

After the characters are extracted and recognized, the result of character recognition (Chinese characters and Hiraganas) is displayed in the printing type form (FIG. 10F).

Thus, the character input frame 31 and the input traces are automatically erased.

Otherwise, when the handwriting character input has been stopped for a specified time and the character recognition is completed, the character input frame can be automatically erased as follows.

FIG. 11 is a flowchart of a character input frame displaying operation in which the character input frame is automatically erased when the handwriting character input has been stopped for a specified time and the character recognition is completed. The character input frame displaying operation will be described below with reference to FIG. 11.

In steps S31 through S39, when a handwriting character is inputted as a coordinate input on the transparent tablet, a character input frame is displayed in a popping-up manner fully on the right-hand side of the display panel 18 with the coordinates represented by the frame display position data stored in the first storage section 15 used as the reference coordinates similarly to steps S11 through S19 of the flowchart of the character input frame displaying operation shown in FIG. 9, and the lapse of n seconds from stoppage of the handwriting character input is detected.

In steps S40 and S41, it is decided whether or not the character recognition for the character written in the character input frame is completed, which is followed by the erasing of the character input frame, and then the result of recognition by the character recognizing section 13 is displayed in the printing type form in the position of the reference coordinates on the display panel 18 similarly to steps S7 and S9 of the flowchart of the character input frame displaying operation shown in FIG. 4.

Thus, when the character input frame is erased, the character input frame displaying operation ends.

In the embodiment, the character input frame is displayed rightward from the initial input position on the display panel 18. However, it is of course acceptable to display the character input frame leftward from the initial input position.

Second Embodiment

The present second embodiment is related to a device for inputting characters by handwriting capable of coping with a character that has been inputted by handwriting while jutting out of the character input frame displayed on the display panel.

Figure 12:
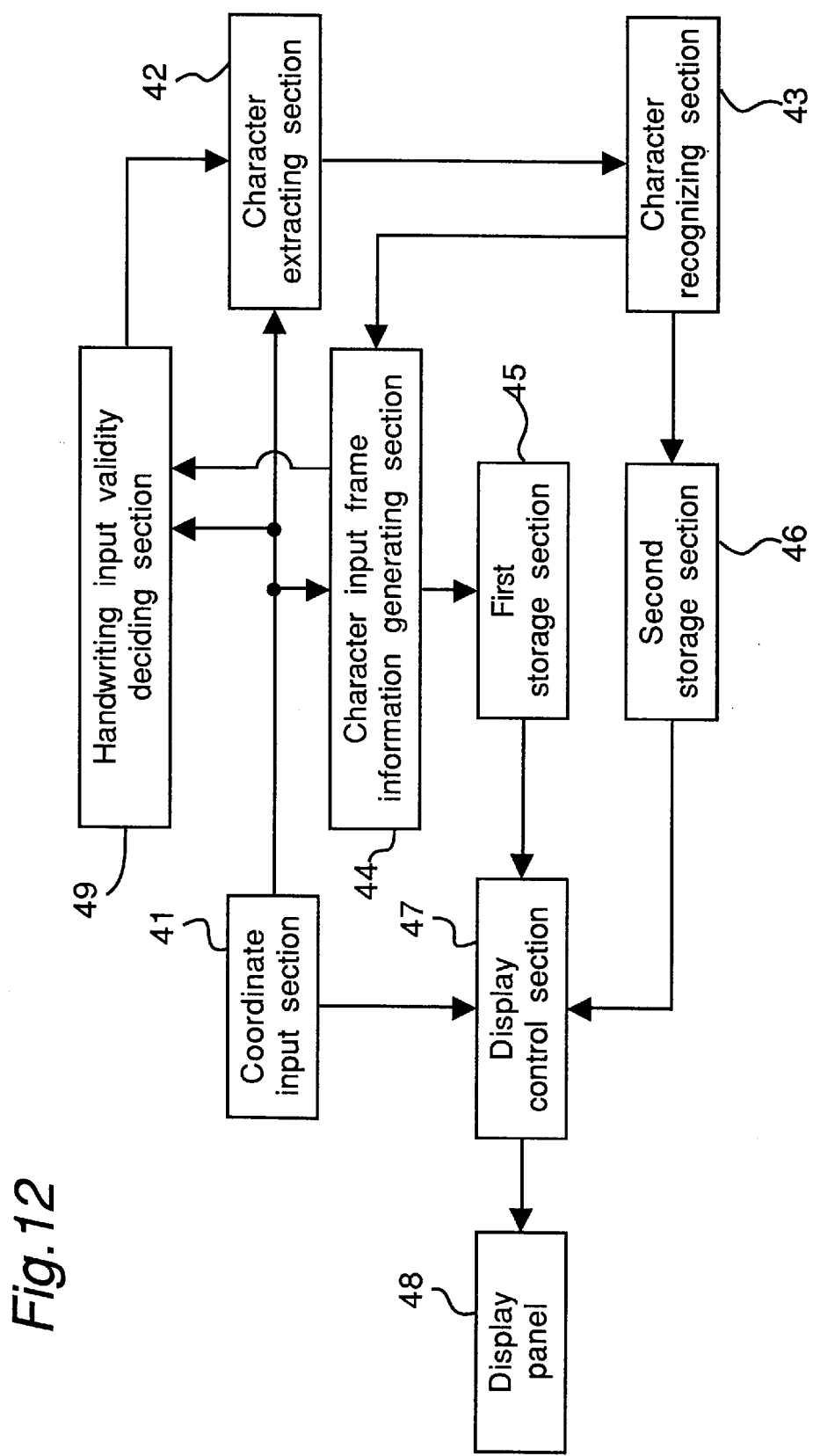
FIG. 12 is a block diagram of a device for inputting characters by handwriting different from that of FIG. 1.

FIG. 12 is a block diagram of the device for inputting characters by handwriting of the present embodiment.

A coordinate input section 41, a character extracting section 42, a character recognizing section 43, a character input frame information generating section 44, a first storage section 45, a second storage section 46, a display control section 47 and a display panel 48 have the same constructions as those of the coordinate input section 11, character extracting section 12, character recognizing section 13, character input frame information generating section 14, first storage section 15, second storage section 16, display control section 17 and display panel 18 of the first embodiment, and operate in a similar manner to display a character input frame on the display panel 48.

A handwriting input validity deciding section 49 sets a valid area in which a handwriting character has been inputted while jutting out of the input area frame displayed on the display panel 48, and decides based on the valid area whether or not the inputted handwriting character is valid. Then, the character extracting section 42 executes character extraction only on the valid handwriting character based on the result of decision.

In this embodiment, the handwriting input validity deciding section 49 independently sets valid areas of a first valid area for deciding the trace coordinate data of a beginning portion of a continuous trace and a second valid area for deciding the whole trace coordinate data of the continuous trace. Then, only when the trace coordinate data of the beginning portion exists in the first valid area and concurrently the trace coordinate data of the whole trace coordinate data exists in the second valid area, then the input is decided to be a valid handwriting character.

Figure 13:
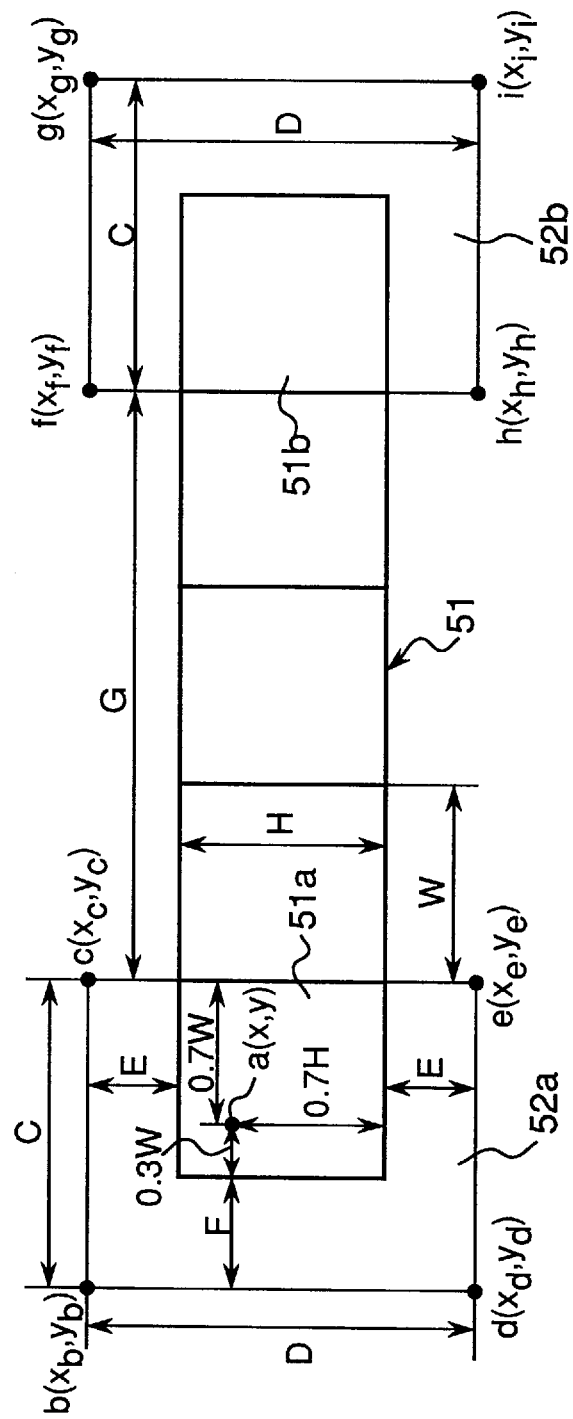
FIG. 13 is an explanatory view of a valid area set by a handwriting input validity deciding section shown in FIG. 12.

FIGS. 13 and 14 show the first valid area set by the handwriting input validity deciding section 49.

The handwriting input validity deciding section 49 takes in the character input frame information from the character input frame information generating section 44, and calculates the coordinates of four corners b, c, d and e of a first valid area 52a which forms a rectangular shape as set around a first cell 51a of a character input frame 51 as shown in FIG. 13 based on the frame display position data (x,y), number N of the cells, cell width W and cell height H according to the following equation.

$$\text{point } b(x_b, y_b) = ((x - 0.3W - F), (y + 0.3H + E))$$

where $E=(D-H)/2$, $F=C-W$

C: Width of first valid areas 52a and 52b

D: Height of first valid areas 52a and 52b $$\text{point } c(x_c, y_c) = ((x+0.7W), y_b)$$

$$\text{point } d(x_d, y_d) = (x_b, (y-0.7H-E))$$

$$\text{point } e(x_e, y_e) = (x_c, y_d)$$

Further, the coordinate values of four corners f, g, h and i of the first valid area 52b set around the last cell 52b of the character input frame 51 are calculated according to the following equation.

$$\text{point } f(x_f, y_f) = ((x_c + G), y_b)$$

where $G=(N-2) \cdot W$

N: Number of cells of character input frame 51

$$\text{point } g(x_g, y_g) = ((x_f + C), y_b)$$

$$\text{point } h(x_h, y_h) = (x_f, y_d)$$

$$\text{point } i(x_i, y_i) = (x_g, y_d)$$

Further, the coordinate values of four corners j, k, l and m of a first valid area 53 set above and below a "z"th cell (excluding the first and last cells) 51z of the character input frame 51 shown in FIG. 14 are calculated according to the following equation.

$$\text{point } j(x_j, y_j) = ((x_c + I), y_b)$$

where $I=(z-2) \cdot W$ $$\text{point } k(x_k, y_k) = ((x_j + W), y_b)$$

$$\text{point } l(x_l, y_l) = (x_j, y_d)$$

$$\text{point } m(x_m, y_m) = (x_k, y_d)$$

The thus calculated coordinates of the points b through m are stored in the internal memory separately for the first valid areas 52a, 52b and 53.

Then, the handwriting input validity deciding section 49 decides whether the handwriting character is valid or invalid as follows from the trace coordinate data transmitted successively from the coordinate input section 41 and the coordinate values of the points b through m.

FIGS. 15A through FIG. 17C show examples in which the handwriting character is validated when it is located in the first valid areas 52a, 52b and 53 even though the input coordinates of the beginning portion of a continuous trace constituting one character is erroneously jutting out of the cell.

Figure 15A:
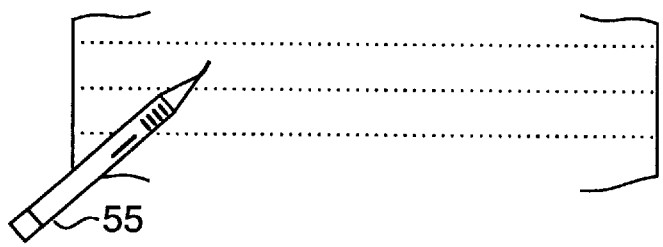
FIGS. 15A through 15C are explanatory views of a validating process by means of the valid area shown in FIG. 13.
Figure 15B:
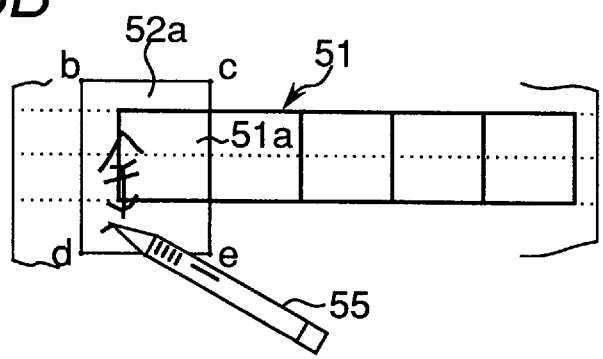
Figure 15C:
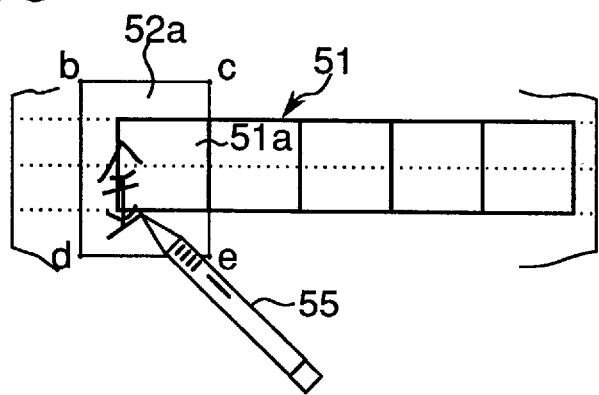

FIGS. 15A through 15C show a case where the handwriting character is validated when it is located in the first valid area 52a even though a position represented by the trace coordinate data of the beginning portion of the continuous trace that is written with the pen kept in contact with the transparent tablet is jutting out of the first cell 51a.

The operator starts to write a handwriting character by means of a pen 55 in a position in which the operator desires to write the character on the transparent tablet (FIG. 15A).

The character input frame 51 is displayed in a popping-up manner with the initial input position on the display panel 48 used as the reference coordinates, and the first cell 51a is recognized as the objective cell to be recognized by the handwriting input validity deciding section 49. Then, based on the transmitted trace coordinate data, it is decided whether or not the trace coordinate data of the beginning portion of a continuous trace constituting one character is located in the first valid area 52a enclosed by the four points b, c, d and e. Consequently, although the position represented by the trace coordinate data of the beginning portion of a continuous trace (the last horizontal line) located in the middle of the first character is jutting left and below out of the first cell 51a to be subjected to the decision, it is decided that the handwriting character is valid since it is located inside the first valid area 52a (FIGS. 15B and 15C).

FIGS. 16A through 16C and FIGS. 17A through 17C show a case where a handwriting character is validated when a position represented by the trace coordinate data of the beginning portion of a continuous trace is located in the first valid area 53 even though the position is located outside a second cell $51_2$ or a third cell $51_3$.

Figure 16A:
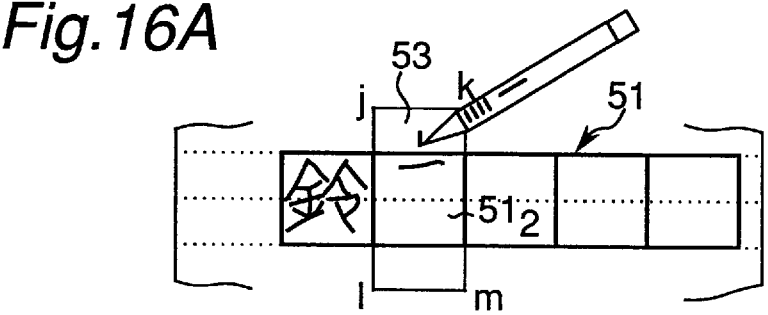
FIGS. 16A through 16C are explanatory views of a validating process by means of the valid area shown in FIG. 14.
Figure 16B:
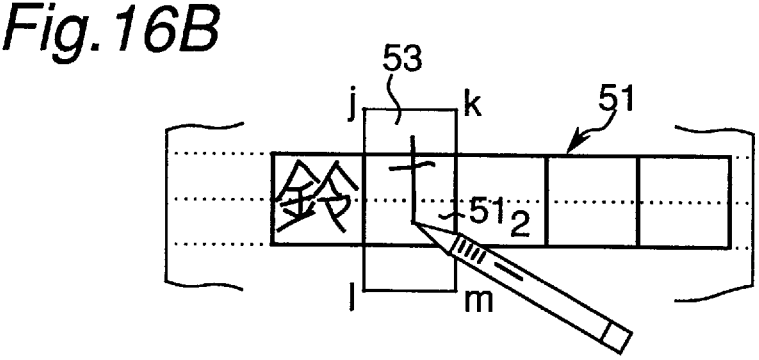
Figure 16C:
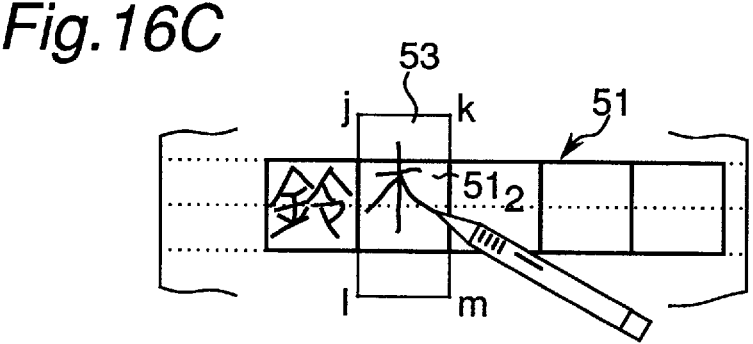

Although a position represented by trace coordinate data of a beginning portion of a continuous trace (vertical line) located in the middle of the second character is located outside the second cell $51_2$ to be subjected to the decision, it is decided that the handwriting character is valid since it is located inside the first valid area 53 (FIGS. 16A through 16C).

Figure 17A:
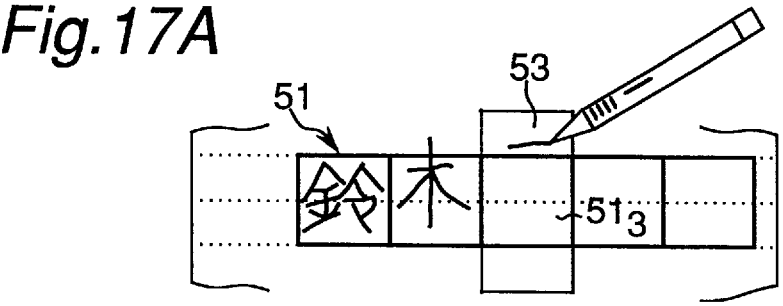
FIGS. 17A through 17C are explanatory views of a validating process different from that of FIGS. 16A through 16C by means of the valid area shown in FIG. 14.
Figure 17B:
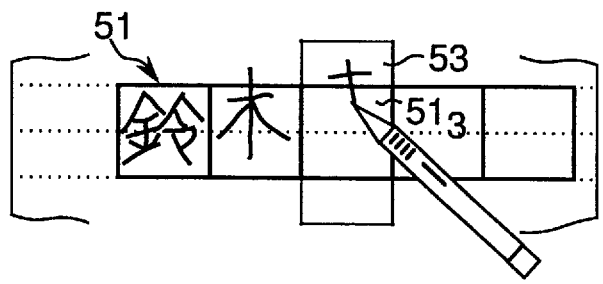
Figure 17C:
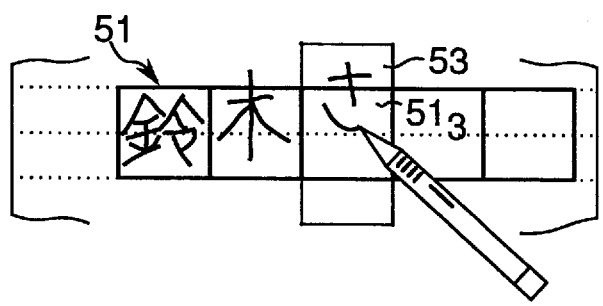

Although positions represented by trace coordinate data of a beginning portion of an initial continuous trace (horizontal line of the third handwriting character) and a beginning portion of a subsequent continuous trace (vertical line of the third handwriting character) of the third handwriting character are located outside the third cell $51_3$ to be subjected to the decision, it is decided that the handwriting character is valid since it is located inside the first valid area 53 (FIGS. 17A through 17C).

Figure 18A:
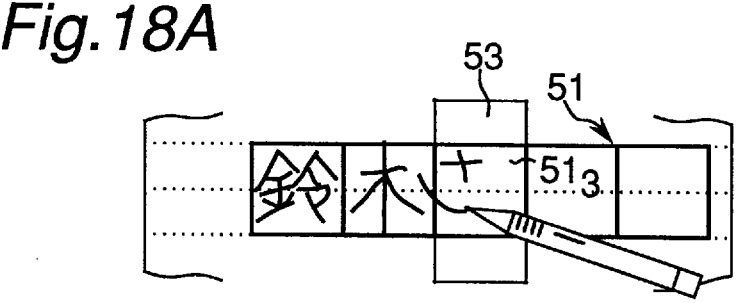
FIGS. 18A through 18C are explanatory views of an invalidating process by means of the valid areas shown in FIGS. 13 and 14.
Figure 18B:
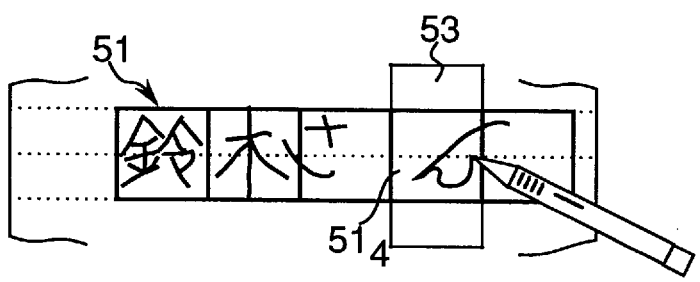
Figure 18C:
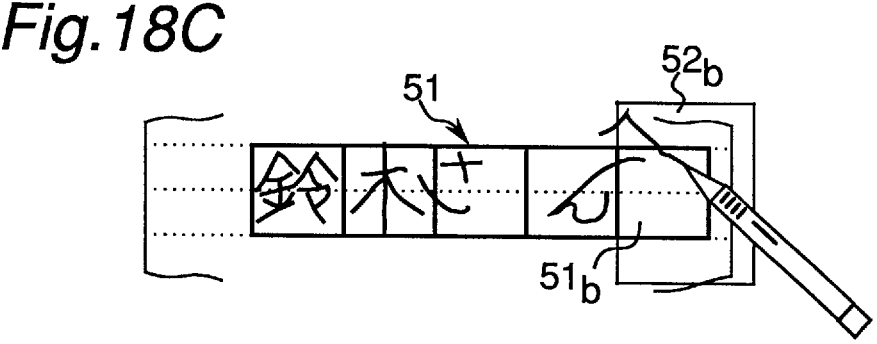

In the above case, when the handwriting character begins to be written from outside the cell to be subjected to the decision and the first valid area of the cell in a manner as shown in FIGS. 18A, 18B and 18C the handwriting character is invalidated.

A position represented by trace coordinate data of a beginning portion of a continuous trace in the middle of the third handwriting character (oblique line of the third handwriting character) is located outside the third cell $51_3$ to be subjected to the decision and located outside the first valid area 53, and therefore the handwriting character is decided to be invalid (FIG. 18A).

A position represented by trace coordinate data of a beginning portion of an initial continuous trace of the fourth handwriting character (line extending to the lower left of the fourth handwriting character) is located outside a fourth cell $51_4$ to be subjected to the decision and located outside the first valid area 53, and therefore the fourth handwriting character is decided to be invalid (FIG. 18B).

A position represented by trace coordinate data of a beginning portion of an initial continuous trace (line extending to the upper right of the fifth character is located outside the last cell 51b to be subjected to the decision and located outside the first valid area 52b, and therefore the fifth handwriting character is decided to be invalid (FIG. 18C).

Figure 19:
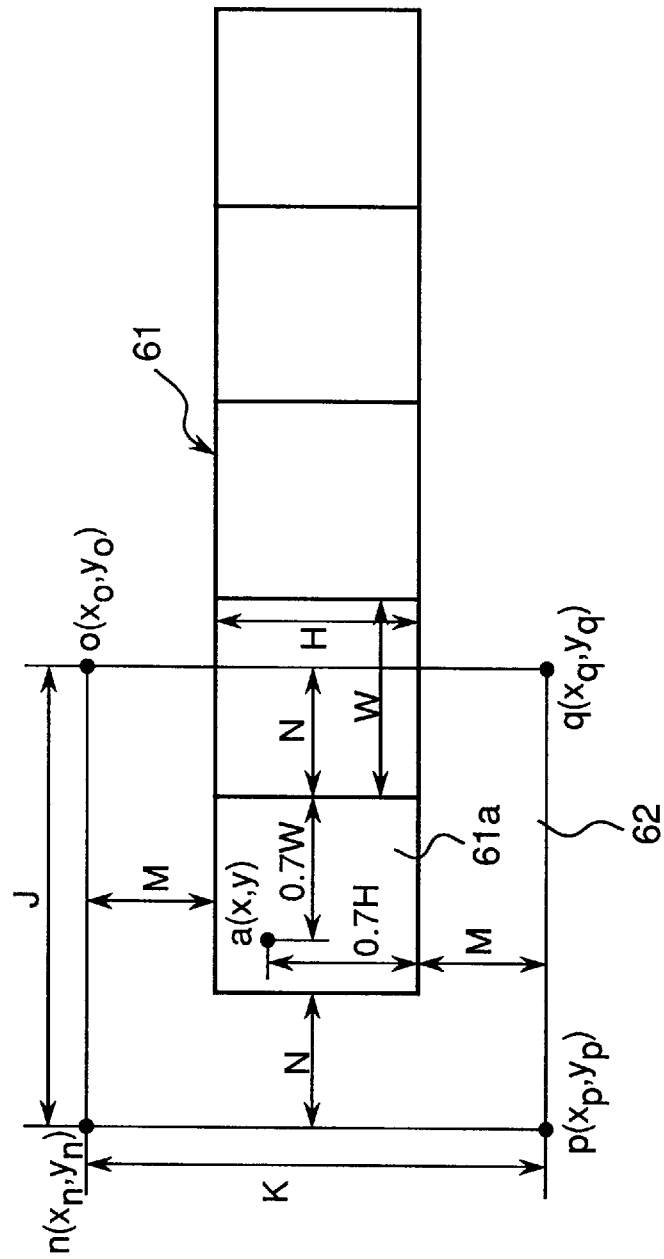
FIG. 19 is an explanatory view of a valid area different from those of FIGS. 13 and 14.
Figure 20:
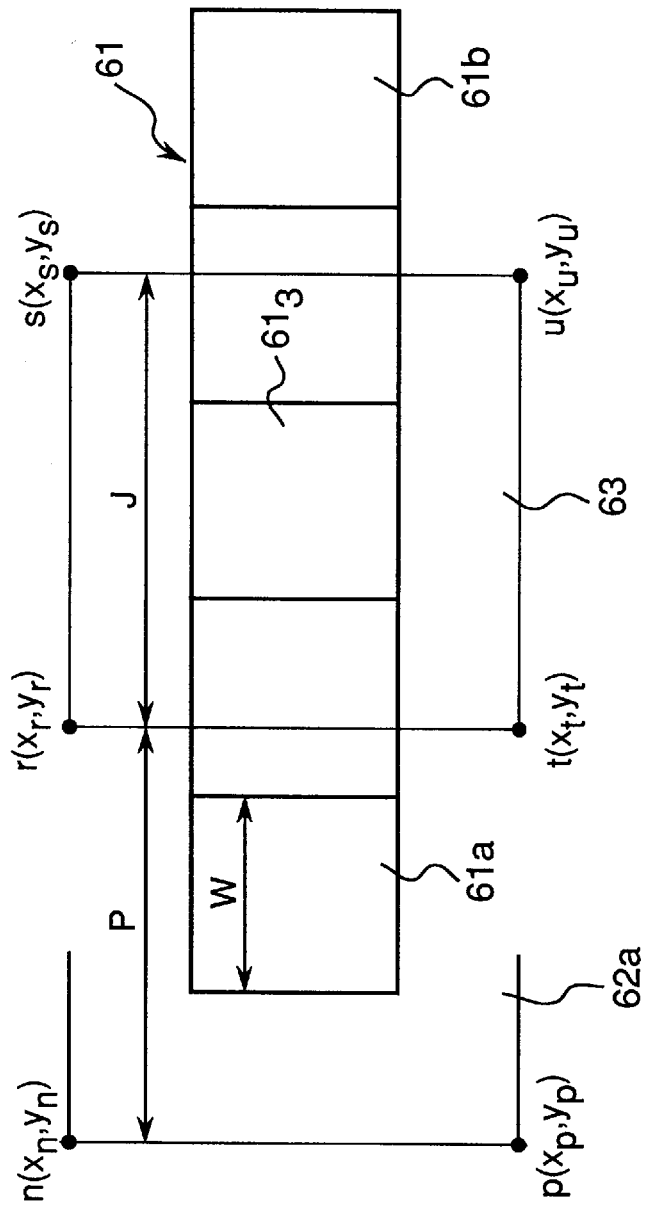
FIG. 20 is an explanatory view of a valid area different from those of FIGS. 13, 14 and 19.

FIGS. 19 and 20 show the second valid area for deciding whether the whole coordinate data of the continuous trace set by the handwriting input validity deciding section 49 are valid or invalid.

The second valid area is set around each cell of the character input frame.

FIG. 19 shows the second valid area relevant to the first cell of the character input frame 61. The handwriting input validity deciding section 49 takes in the character input frame information from the character input frame information generating section 44 and calculates the coordinates of four corners n, o, p and q of a second valid area 62 which forms a rectangular shape as set around a first cell 61a in the character input frame 61 as shown in FIG. 19 based on the frame display position data (x,y), number N of the cells, cell width W and cell height H according to the following equation.

point $n(x_n, y_n) = ((x-0.3W-N), (y+0.3H+M))$ where M=(K−H)/2,

N=(J−W)/2

J: Width of second valid area 62

K: Height of second valid area 62 point $o(x_o, y_o) = ((x+0.7W+N), y_n)$ point $p(x_p, y_p) = (x_n, (y-0.7H-M))$ point $q(x_q, y_q) = (x_o, y_p)$ Further, the coordinate values of four corners r, s, t and u of a second valid area 63 set around a "z"th cell (excluding the first cell) 61z of the character input frame 61 are calculated according to the following equation.

point $r(x_r, y_r) = ((x_n+P), y_n)$ where P=(z−1)·W point $s(x_s, y_s) = ((x_r+J), y_n)$ point $t(x_t, y_t) = (x_r, y_p)$ point $u(x_u, y_u) = (x_s, y_p)$ The thus calculated coordinates of the points n through u are stored in the internal memory separately for the second valid areas 62 and 63.

Then, the handwriting input validity deciding section 49 decides whether the handwriting character is valid or invalid as follows from the trace coordinate data successively transmitted from the coordinate input section 41 and the coordinate values of the points n through u in regard to each character where the trace coordinate data of the beginning portion of the continuous trace is decided to be located in any cell of the character input frame 61 or located in the first valid areas 52 and 53 shown in FIGS. 13 and 14, and transmits the valid/invalid information representing the result of decision to the character extracting section 42.

Figure 21A:
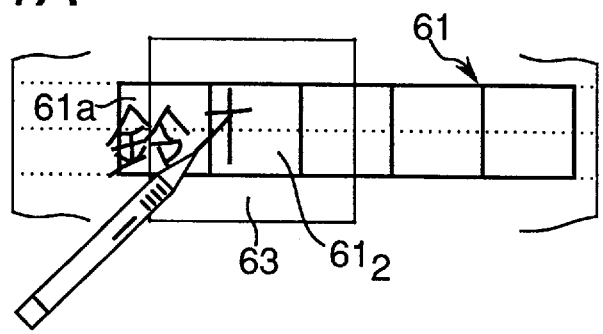
FIGS. 21A through 21C are explanatory views of a validating process by means of the valid areas shown in FIGS. 19 and 20.
Figure 21B:
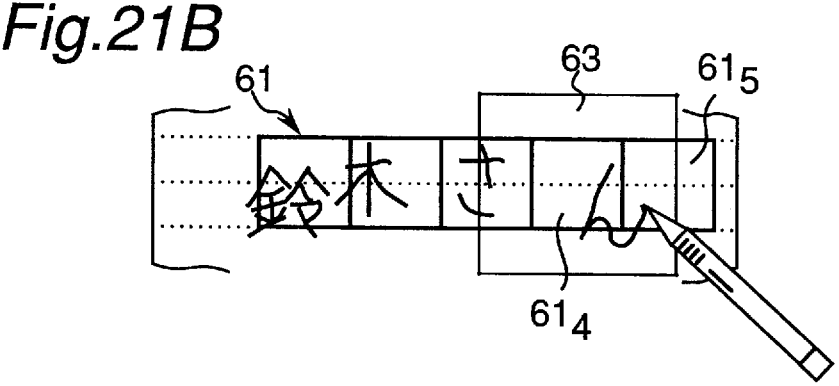
Figure 21C:
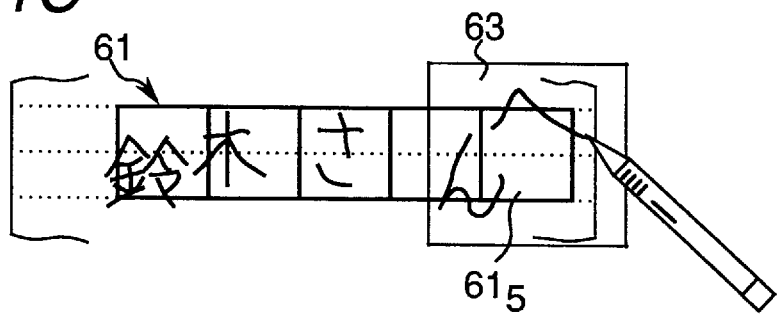

FIGS. 21A through 21C show a case in which a handwriting character is validated when it is located in the second valid areas 62 and 63 even though a middle portion or an end portion of a continuous trace is erroneously jutting out of the character input frame 61.

Although a position represented by the last trace coordinate data of a continuous trace located in the middle of the second handwriting character is located inside the first cell 61a adjacent to a second cell $61_2$ to be subjected to the decision, it is decided that the second handwriting character is valid since it is located inside the second valid area 63 (FIG. 21A).

Although positions represented by trace coordinate data of a middle portion and an end portion of a continuous trace of the fourth handwriting character are located outside a last cell $61_5$ adjacent to a fourth cell $61_4$ to be subjected to the decision and outside the cell $61_4$ (below the cell), it is decided that the fourth handwriting character is valid since it is located inside the second valid area 63 (FIG. 21B).

Although a position represented by trace coordinate data of a middle portion of a continuous trace of the fourth handwriting character are located outside the last cell $61_5$ to be subjected to the decision, it is decided that the fourth handwriting character is valid since it is located inside the second valid area 63 (FIG. 21C).

Thus, in the present embodiment, with the provision of the handwriting input validity deciding section 49, a valid area is set around each cell constituting the character input frame based on the character input frame information set by the character input frame information generating section 44, and the coordinates thereof are stored in the internal memory. Then, it is decided whether or not the continuous trace based on the trace coordinate data from the coordinate input section 41 is located in the valid area, and the valid/invalid information representing the result of decision is transmitted to the character extracting section 42.

Therefore, according to the present embodiment, the handwriting input validity deciding section 49 decides that the handwriting character is valid when the traces are located in the cell to be subjected to the decision and the second valid area except for the case where the handwriting character begins to be written from outside the cell currently subjected to the decision and the first valid area.

Thus, the operator is allowed to perform handwriting character input without seriously taking care of writing characters inside the character input frame displayed on the display panel 48.

Third Embodiment

The present embodiment is related to a device for inputting characters by handwriting in which, when a subsequent handwriting character is inputted to an area except for the character input frame displayed on the display panel before a string of characters inputted by handwriting is recognized, the character input frame that has been displayed is erased, and a character input frame is displayed in a position in which a handwriting character input is newly performed.

Figure 22:
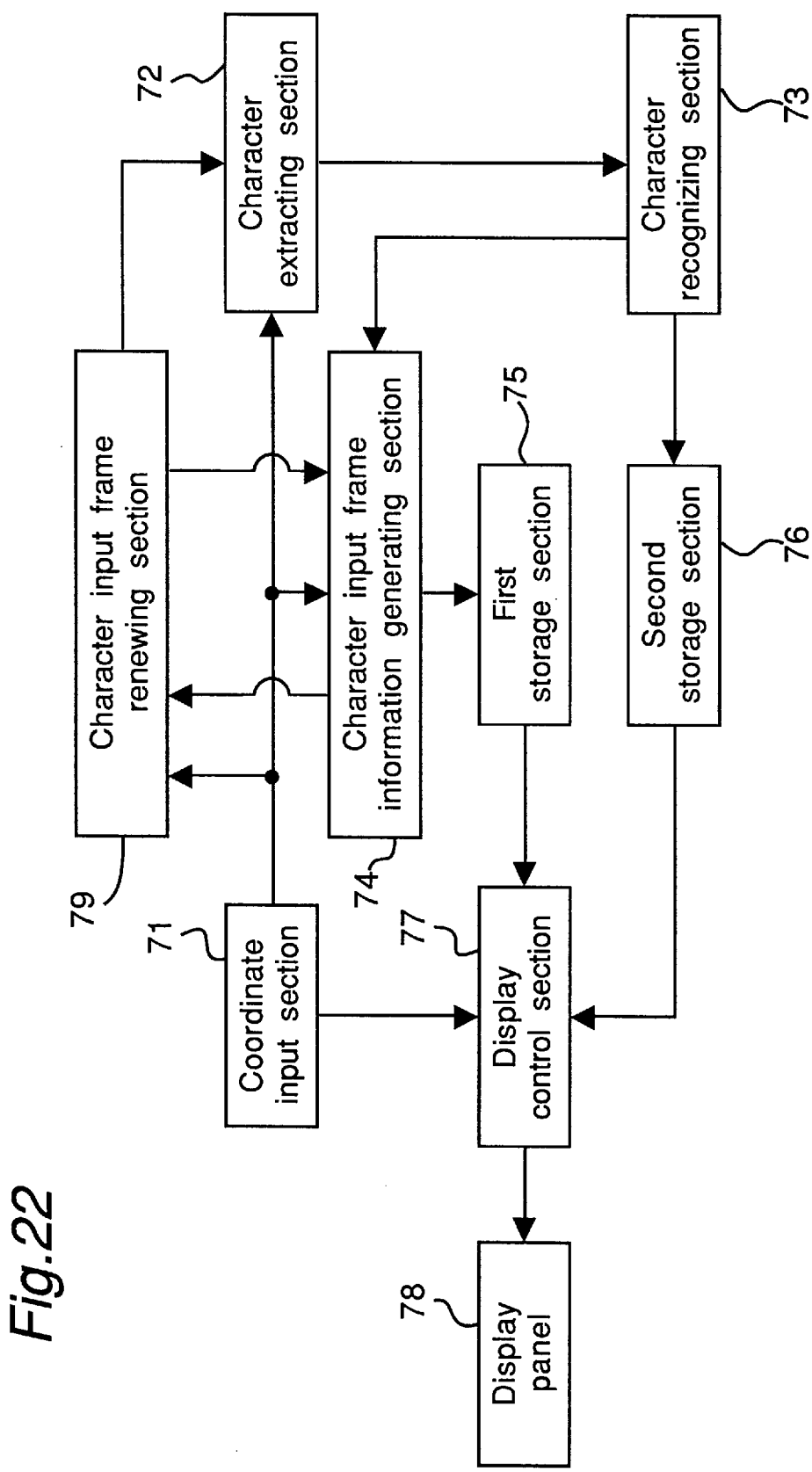
FIG. 22 is a block diagram of a device for inputting characters by handwriting different from those of FIGS. 1 and 12.

FIG. 22 is a block diagram of a device for inputting characters by handwriting of the present embodiment.

A coordinate input section 71, a character extracting section 72, a character recognizing section 73, a character input frame information generating section 74, a first storage section 75, a second storage section 76, a display control section 77 and a display panel 78 have the same constructions as those of the coordinate input section 11, character extracting section 12, character recognizing section 13, character input frame information generating section 14, first storage section 15, second storage section 16, display control section 17 and display panel 18 of the first embodiment, and operates in a similar manner to display a character input frame on the display panel 78.

A character input frame renewing section 79 erases the character input frame displayed on the display panel 78 and displays a character input frame in the position in which a handwriting character input is newly performed as follows.

That is, the character input frame renewing section 79 takes in the frame display position data (x,y), number N of the cells, cell width W and cell height H set by the character input frame information generating section 74, calculates the coordinates of the character input frame on the display panel 78 displayed by the display control section 77, and stores the coordinates in an internal memory (not shown). Then, possible occurrence of a handwriting character input outside the currently displayed character input frame is watched for according to the trace coordinate data transmitted successively from the coordinate input section 71 and the coordinates of the character input frame. When a handwriting character input occurs outside the character input frame, there is transmitted character input frame renewal information to the character input frame information generating section 74.

Upon receiving the character input frame renewal information before receiving a recognition completion information from the character recognizing section 73, the character input frame information generating section 74 calculates the frame display position data (x,y) representing an initial input position outside the currently displayed character input frame and the number N of the cells based on a current coordinate input position information from the coordinate input section 71, and renews the storage contents of the first storage section 75 by the result of calculation. Consequently, the character input frame displayed on the display panel 78 by the display control section 77 is erased, and a next character input frame is displayed in a position expressed by new frame display position data (x,y).

Figure 23:
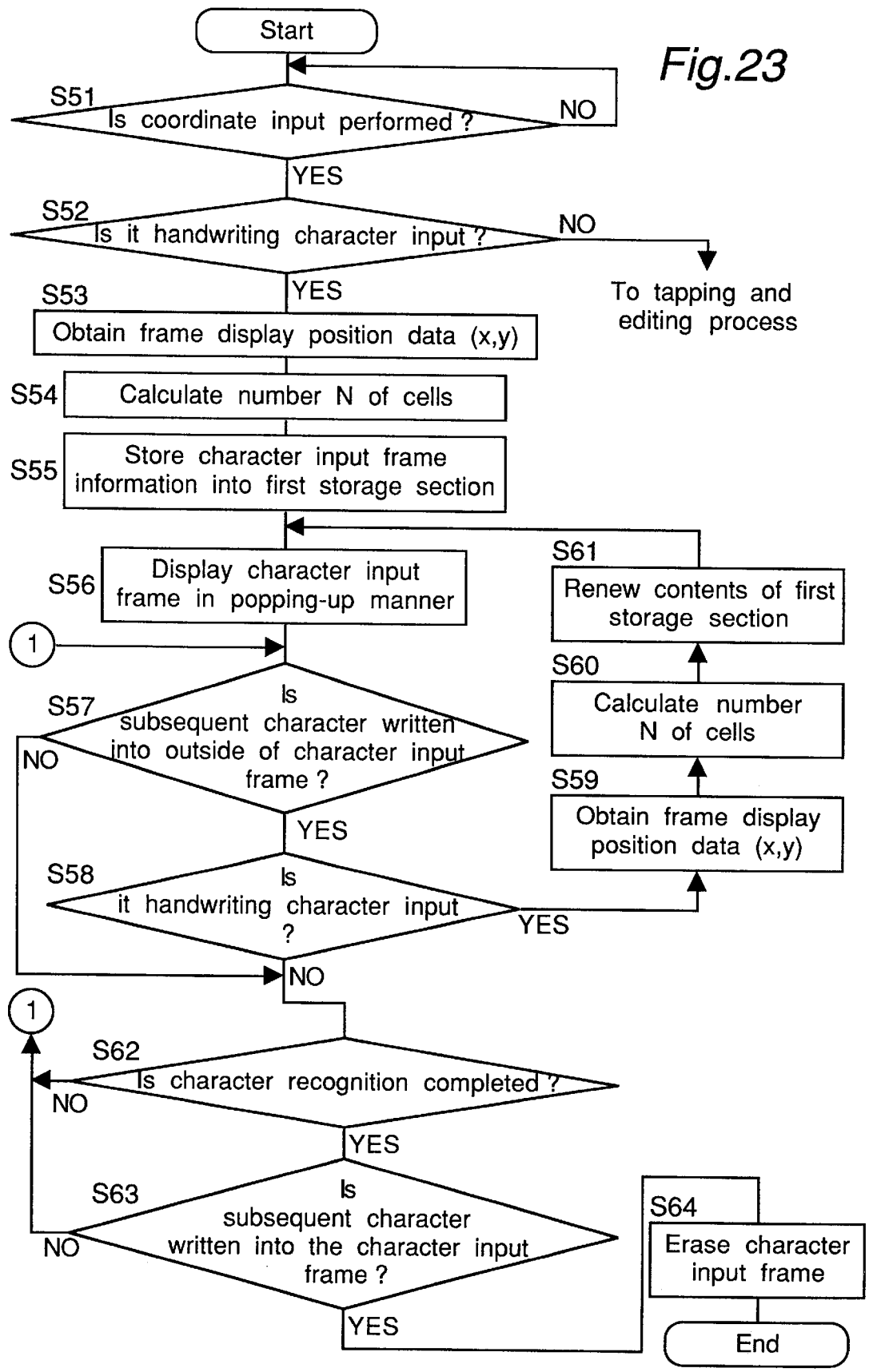
FIG. 23 is a flowchart of a character input frame displaying/renewing operation executed by a coordinate input section, a character input frame information generating section, a display control section and a character input frame renewing section shown in FIG. 22.

FIG. 23 is a flowchart of character input frame displaying/renewing operation executed by the coordinate input section 71, character input frame information generating section 74, display control section 77 and character input frame renewing section 79. The character input frame displaying/renewing operation will be described with reference to FIG. 23.

In steps S51 through S56, when a handwriting character is inputted as a coordinate input on the transparent tablet, a character input frame is displayed in a popping-up manner fully on the right-hand side of the display panel 78 with the coordinates represented by the frame display position data stored in the first storage section 75 used as the reference coordinates similarly to steps S1 through S6 of the flowchart of the character input frame displaying operation shown in FIG. 4.

In step S57, the character input frame renewing section 79 decides whether or not a coordinate input to the outside of the character input frame occurs based on the trace coordinate data transmitted successively from the coordinate input section 71 and the coordinates of the character input frame stored in the internal memory. Consequently, when a coordinate input to the outside of the character input frame occurs, the character input frame renewal information is transmitted to the character input frame information generating section 74, and the program flow proceeds to step S58. If not, the program flow proceeds to step S62.

In step S58, the character input frame information generating section 74 decides whether or not the coordinate input detected in step S57 is a handwriting character input by the pen based on the coordinate input position information from the coordinate input section 71. Consequently, when the input is a handwriting character input, the program flow proceeds to step S59. Otherwise, the program flow proceeds to step S62.

In steps S59 and S60, the next frame display position data (x,y) and the number N of the cells are obtained by the character input frame information generating section 74 based on the coordinate input position information relevant to the coordinate input detected in step S57.

In step S61, the storage contents of the first storage section 75 are renewed by the character input frame information generating section 74 according to the obtained new frame display position data (x,y), number N of the cells, cell width W and cell height H. Then, the result of recognition executed by the character recognizing section 73 for the character written in the character input frame is displayed in the printing type form in the position of the character input frame on the display panel 78.

Subsequently, the program flow returns to step S56 to erase the character input frame displayed on the display panel 78, and the next character input frame is displayed in the position of the handwriting character input outside the character input frame.

In steps S62 through S64, similarly to steps S7 through S9 of the flowchart of the character input frame displaying operation shown in FIG. 4, it is decided whether or not the character recognition for the character written in the character input frame is completed, it is decided whether or not a subsequent character is written in the character input frame, which is followed by the erasing of the character input frame, and the result of recognition executed by the character recognizing section 73 is displayed in the printing type form in the position of the reference coordinates on the display panel 78.

Thus, when the character input frame is erased, the character input frame displaying/renewing operation ends.

FIGS. 24A through 24E show a state of display/renewal of the character input frame through the character input frame displaying/renewing operation shown in FIG. 23.

Figure 24A:
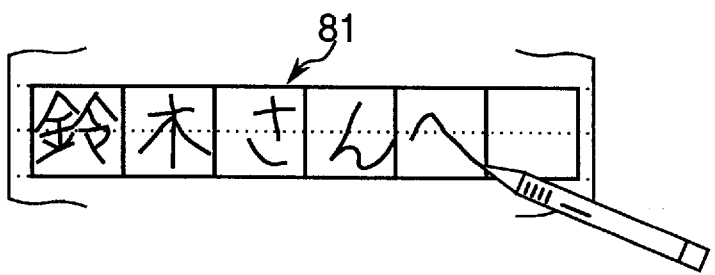
FIGS. 24A through 24E are views showing a display/renewal state of the character input frame through a character input frame display/renewal processing shown in FIG. 23.

Handwriting characters are written by the pen in a character input frame 81 displayed in a popping-up manner in response to a handwriting character input onto the transparent tablet, and the traces thereof are displayed on the display panel 78 (FIG. 24A).

Figure 24B:
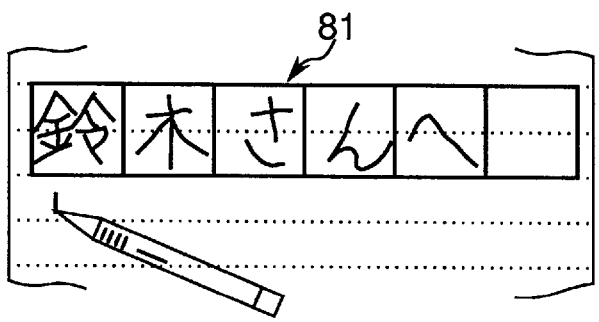

Before completing the character recognition by the character recognizing section 73 for the string of characters written by hand in the character input frame 81, a new handwriting Japanese character begins to be written outside the character input frame 81 (FIG. 24B).

Figure 24C:
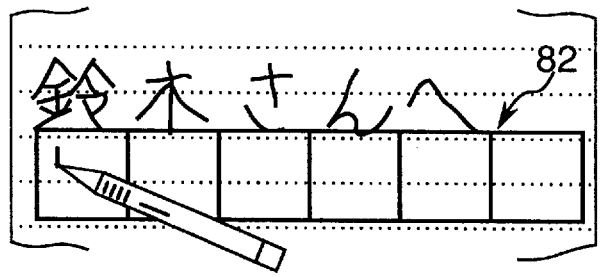

The character input frame 81 is erased, and with the initial input position of the new handwritten character used as the reference coordinates, a new character input frame 82 is displayed in a popping-up manner on the right-hand side thereof (FIG. 24C).

Figure 24D:
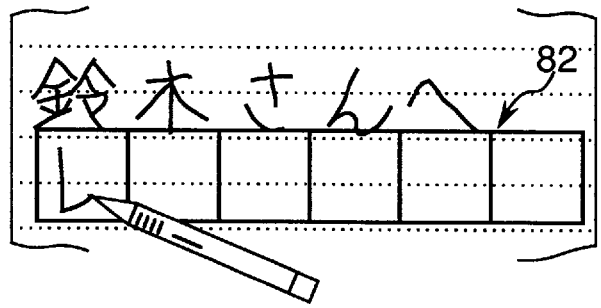

The traces of the handwriting character written in the newly displayed character input frame 82 are displayed (FIG. 24D).

Figure 24E:
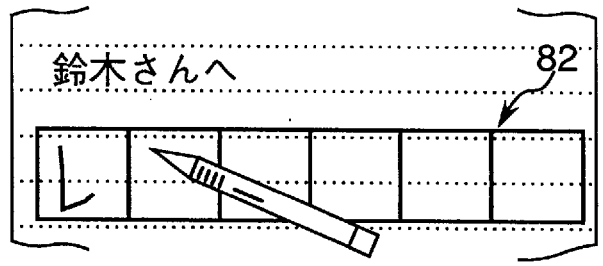

The result of recognition for the string of characters that have been already inputted by handwriting is displayed in the printing type form in the input position (FIG. 24E).

Figure 25:
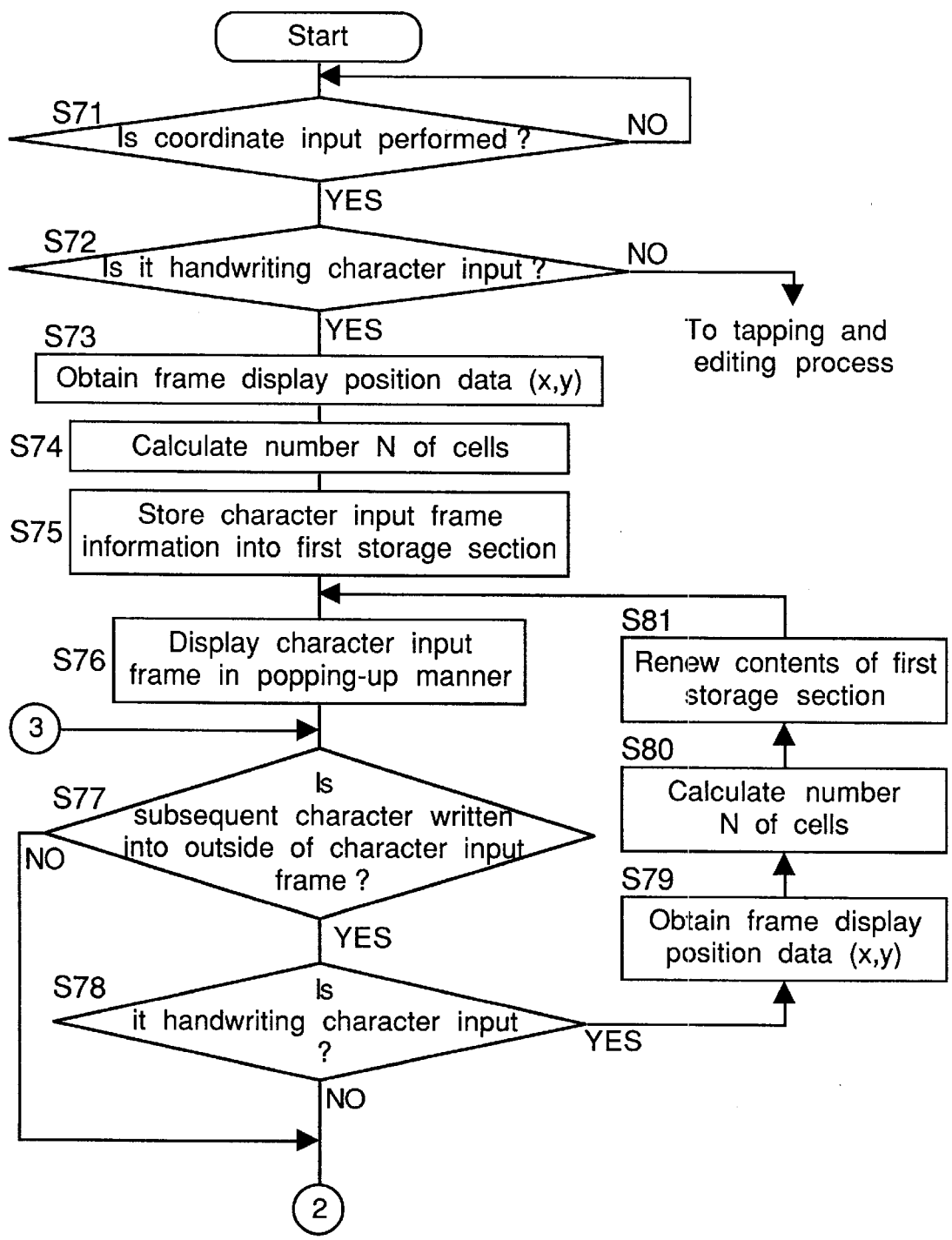
FIG. 25 is a flowchart of a character input frame displaying/renewing operation in which a character input is automatically erased when a handwriting character input has been stopped for a specified time.
Figure 26:
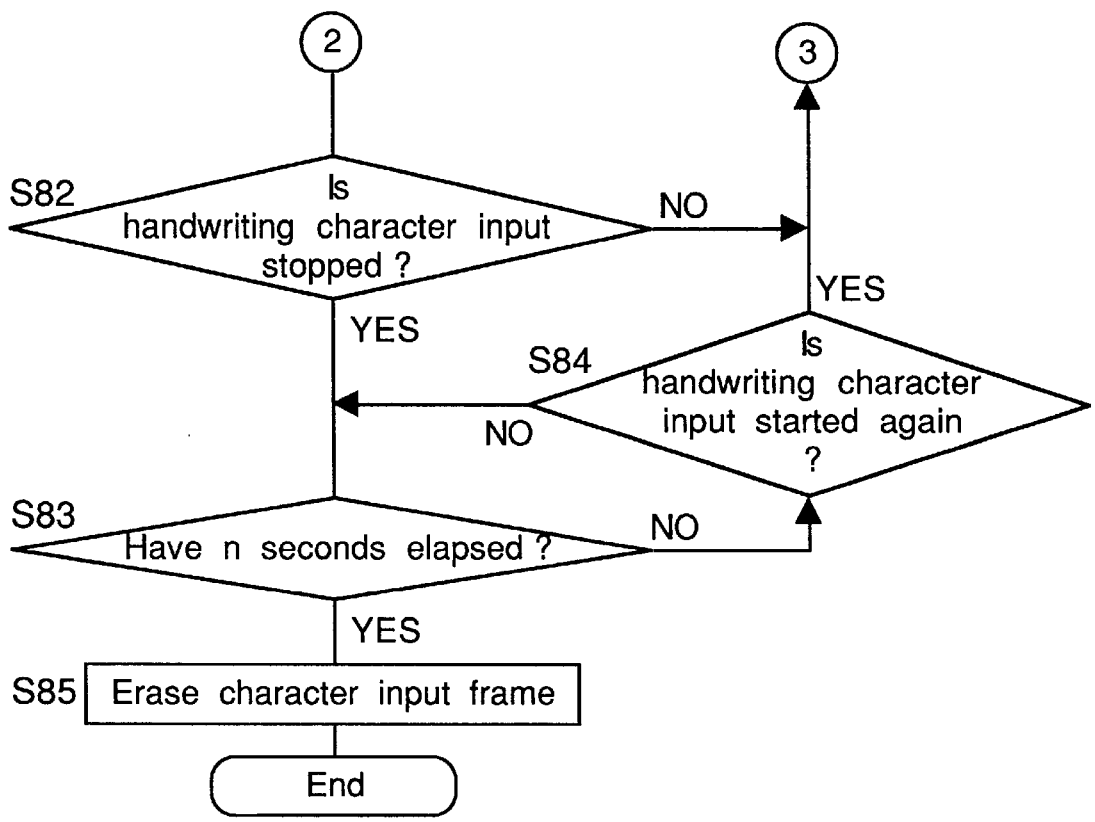
FIG. 26 is a flowchart of the character input frame displaying/renewing operation continued from FIG. 25.

FIGS. 25 and 26 are flowcharts of the character input frame displaying/renewing operation for automatically erasing the character input frame when the handwriting character input has been stopped for a specified time. The character input frame displaying/renewing operation will be described below with reference to FIGS. 25 and 26.

In steps S71 through S81, when a handwriting character is inputted as a coordinate input on the transparent tablet, a character input frame is displayed in a popping-up manner fully on the right-hand side of the display panel 78 with the coordinates represented by the frame display position data stored in the first storage section 75 used as the reference coordinates similarly to steps S51 through S61 of the flowchart of the character input frame displaying/renewing operation shown in FIG. 23.

When a handwriting character input to the outside of the currently displayed character input frame occurs, a result of recognition of the handwriting character written in the character input frame is displayed in the printing type form, which is followed by the erasing of the character input frame, and the next character input frame is displayed in a new handwriting character input position.

In steps S82 through S85 shown in FIG. 26, when n seconds have elapsed from stoppage of the handwriting character input, the character input frame is erased, which is followed by the recognition of the handwriting character written in the character input frame, and the result of recognition is displayed in the printing type form similarly to steps S17 through S20 of the flowchart of the character input frame displaying operation shown in FIG. 9. Otherwise, when n seconds have not elapsed, the program flow returns to step S77 to wait for a handwriting character input to the outside of the character input frame or wait for the elapse of n seconds from the stop of the handwriting character input.

Thus, when the character input frame is erased, the character input frame displaying/renewing operation ends.

Figure 28:
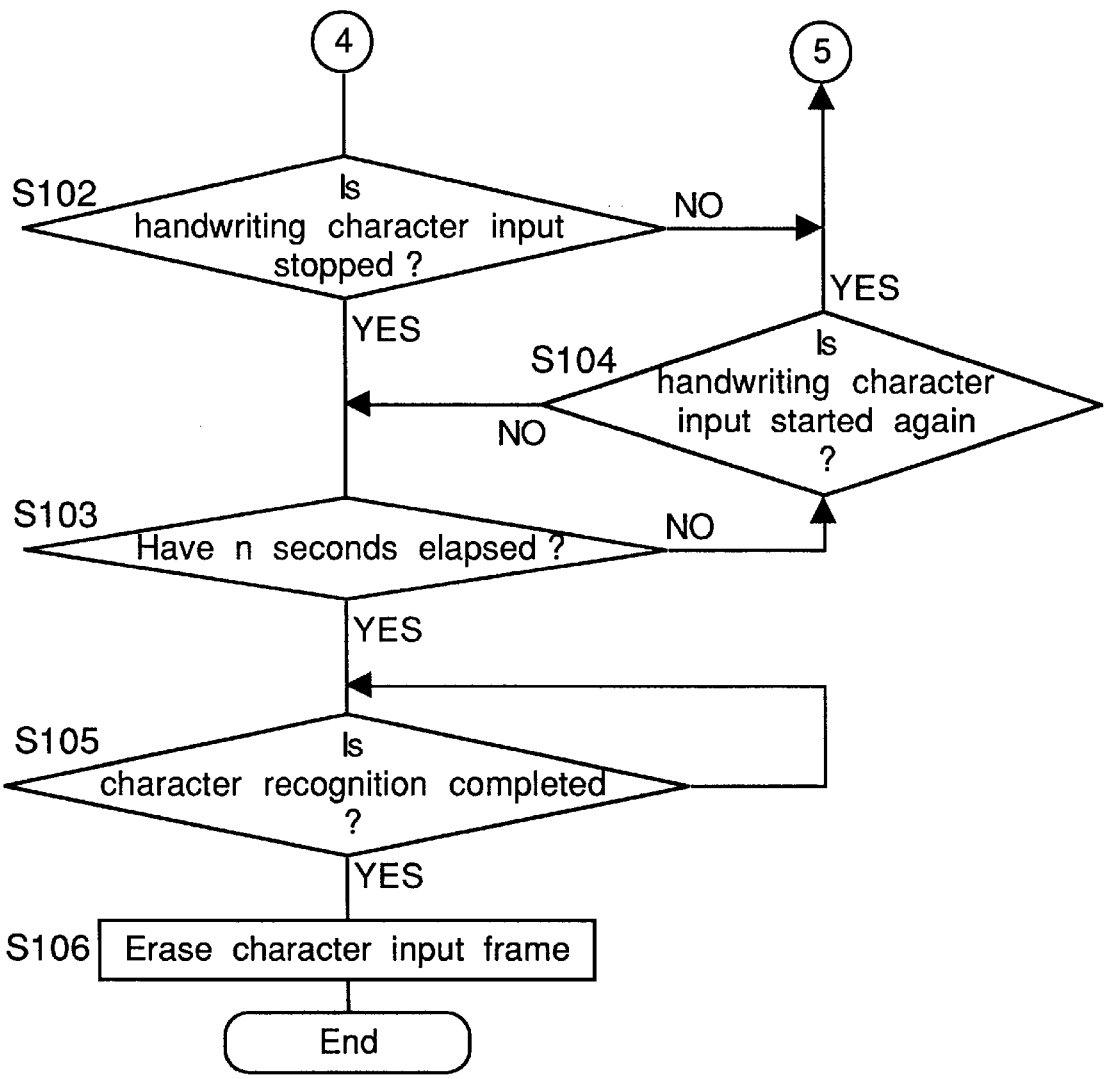
FIG. 28 is a flowchart of the character input frame displaying/renewing operation continued from FIG. 27.

FIGS. 27 and 28 show a flowchart of the character input frame displaying/renewing operation for automatically erasing the character input frame when the handwriting character input has been stopped for a specified time and the character recognition is completed. The character input frame displaying/renewing operation will be described below with reference to FIGS. 27 and 28.

In steps S91 through S101, when a handwriting character is inputted as a coordinate input on the transparent tablet, a character input frame is displayed in a popping-up manner fully on the right-hand side of the display panel 78 with the coordinates represented by the frame display position data stored in the first storage section 75 used as the reference coordinates similarly to steps S51 through S61 of the flowchart of the character input frame displaying/renewing operation shown in FIG. 23.

When a handwriting character input to the outside of the currently displayed character input frame occurs, a result of recognition of the handwriting character written in the character input frame is displayed in the printing type form, which is followed by the erasing of the character input frame, and the next character input frame is displayed in a new handwriting character input position.

In steps S102 through S106, when n seconds have elapsed from the stop of the handwriting character input and character recognition of the handwriting character written in the character input frame is completed, the character input frame is erased and the result of recognition is displayed in the printing type form similarly to steps S37 through S41 of the flowchart of the character input frame displaying operation shown in FIG. 11. Otherwise, when n seconds have not elapsed, the program flow returns to step S97 to wait for a handwriting character input to the outside of the character input frame or wait for the elapse of n seconds from the stop of the handwriting character input.

Thus, when the character input frame is erased, the character input frame displaying/renewing operation ends.

Thus, in the present embodiment, with the provision of the character input frame renewing section 79, it is decided whether or not a handwriting character is inputted to the outside of the character input frame displayed currently on the display panel 78 based on the character input frame information set by the character input frame information generating section 74 and the trace coordinate data from the coordinate input section 71, and the character input frame renewal information representing the result of decision is transmitted to the character input frame information generating section 74.

Then, the character input frame information generating section 74 calculates the frame display position data (x,y) and the number N of the cells representing a new input position to renew the contents of the first storage section 75, erases the character input frame, and displays the next character input frame in the new input position.

Therefore, according to the present embodiment, even when the operator changes the handwriting character input position any time in a desired place on the transparent tablet, the display position of the character input frame is renewed in the desired handwriting input position. Therefore, the operator is allowed to perform handwriting character input regardless of the character input frame displayed currently on the display panel 78. Even in such a case, a satisfactory result of character recognition is obtained.

Fourth Embodiment

The present embodiment is related to a device for inputting characters by handwriting capable of changing the size of a character input frame displayed in a popping-up manner on a display panel.

Figure 29:
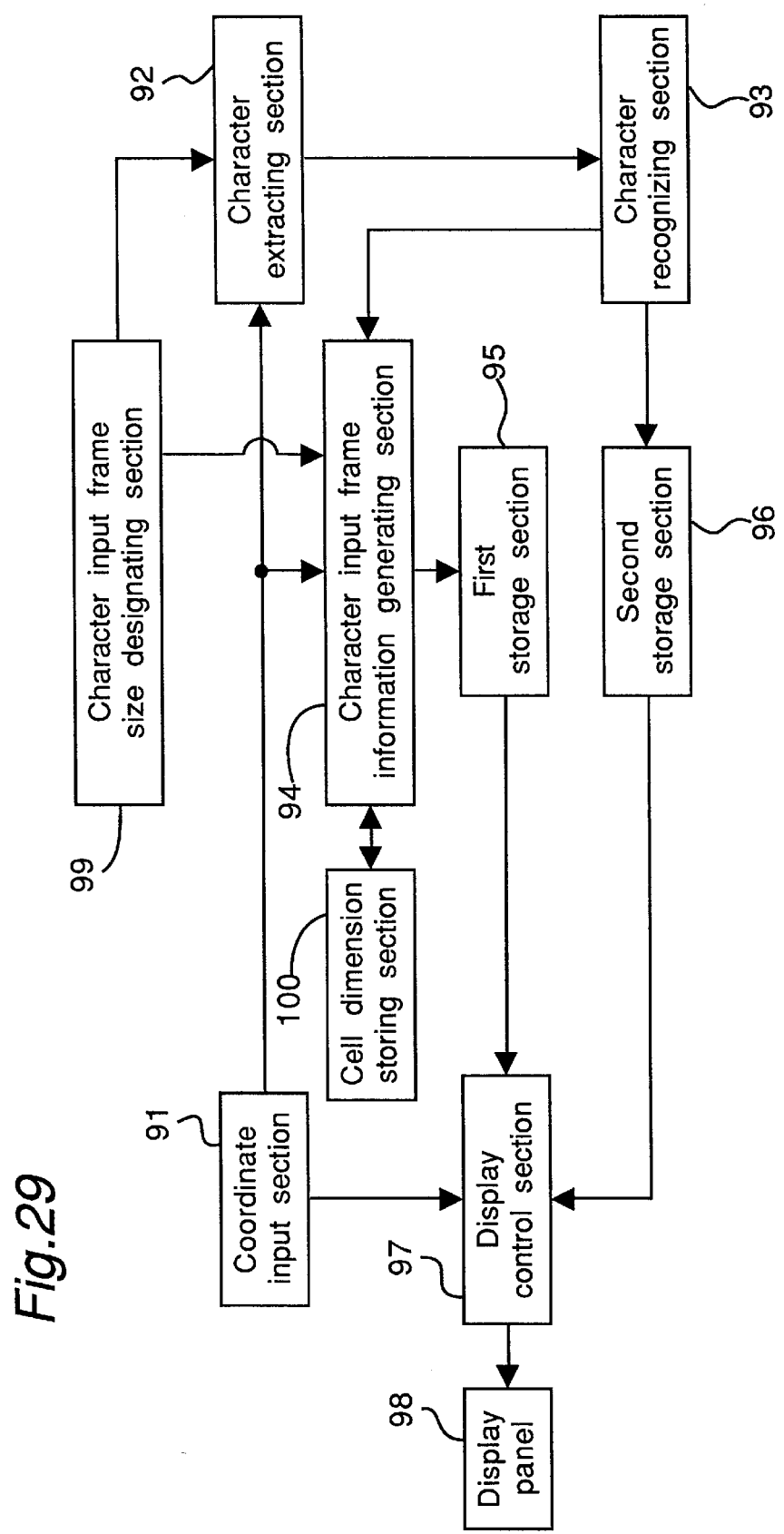
FIG. 29 is a block diagram of a device for inputting characters by handwriting different from those of FIGS. 1, 12 and 22.

FIG. 29 is a block diagram of the device for inputting characters by handwriting of the present embodiment.

A coordinate input section 91, a character extracting section 92, a character recognizing section 93, a character input frame information generating section 94, a first storage section 95, a second storage section 96, a display control section 97 and a display panel 98 have the same constructions as those of the coordinate input section 11, character extracting section 12, character recognizing section 13, character input frame information generating section 14, first storage section 15, second storage section 16, display control section 17 and display panel 18 of the first embodiment, and operates in a similar manner to display a character input frame on the display panel 78.

A character input frame size designating section 99 is operated by the operator to designate the size of the character input frame displayed in a popping-up manner on the display panel 98. The character input frame size designating section 99 is implemented by an operating button comprised of the display panel 98 and a transparent tablet (not shown) laminated on the display panel 98.

In a cell dimension storing section 100, values of cell width W and cell height H constituting the character input frames of a variety of sizes are stored separately for each character input frame size.

In the above construction, the character input frame information generating section 94 reads a combination of cell width W and cell height H corresponding to a character input frame size designated by the character input frame size designating section 99, and calculates the number N of the cells by means of the read cell width W. Then, the values of the calculated number N of the cells, frame display position data (x,y) obtained based on the coordinate input position information from the coordinate input section 91, and the read cell width W and cell height H are transmitted to the first storage section 9S to be stored therein.

Figure 30A:
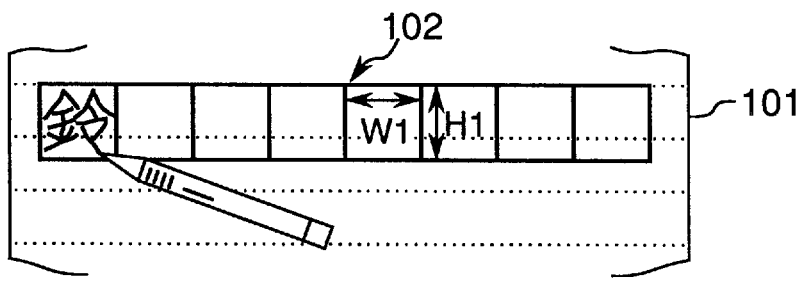
FIGS. 30A through 30C are views showing a display example of a character input frame by the device for inputting characters by handwriting shown in FIG. 29.
Figure 30B:
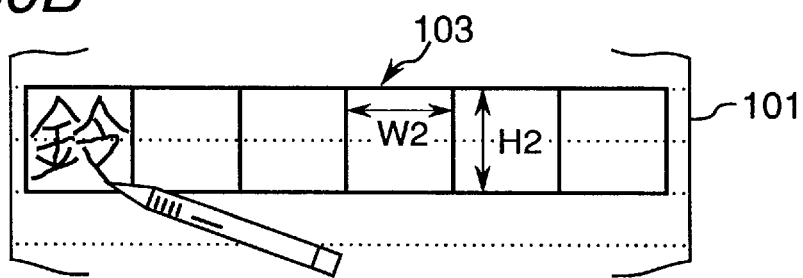
Figure 30C:
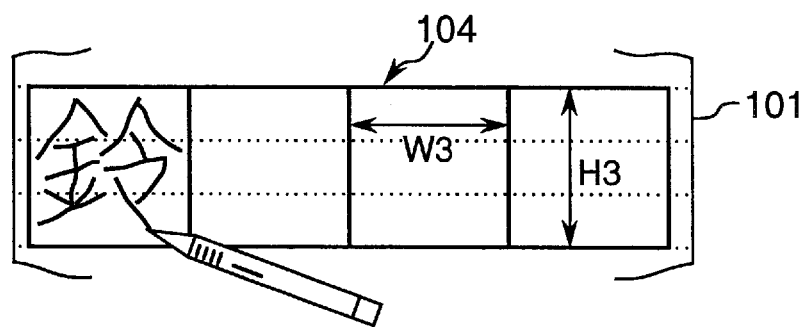

FIGS. 30A through 30C show a display example of the character input frame when the character input frame size is switched between "small", "medium" and "large" by the character input frame size designating section 99.

When the character input frame size "small" is designated, a character input frame 102 comprised of cells each having a width $W_1$ and a height $H_1$ corresponding to the character input frame size "small" is displayed fully in a display area 101 of the display panel 98. In this case, the number N of the cells is "8" (FIG. 30A).

When the character input frame size is changed to "medium", a character input frame 103 comprised of enlarged cells each having a width $W_2$ and a height $H_2$ corresponding to the character input frame size "medium" is displayed fully in the display area 101. In this case, the number N of the cells is "6" (FIG. 30B).

When the character input frame size is changed to "large", a character input frame 104 comprised of cells each having a width $W_3$ and a height $H_3$ corresponding to the character input frame size "large" is displayed fully in the display area 101. In this case, the number N of the cells is "4" (FIG. 30C).

Thus, in the present embodiment, with the provision of the character input frame size designating section 99 and the cell dimension storing section 100, the character input frame information generating section 94 reads from the cell dimension storing section 100 the values of the width W and height H of a cell of a size corresponding to the size designated by the character input frame size designating section 99, obtains character input frame information for displaying the character input frame of the designated size, and transmits the information to the first storage section 95.

Therefore, according to the present embodiment, the operator is allowed to perform handwriting character input in a desired size by displaying the character input frame of the desired size in a popping-up manner, or allowed to perform handwriting input of a lot of characters at a stretch while displaying the small-size character input frame.

Fifth Embodiment

The present embodiment is related to a device for inputting characters by handwriting in which a traced character that has been extracted from a handwritten character and then normalized is displayed on the display panel, and a character input frame is displayed in a popping-up manner rightward from an initial input position on a display panel.

Figure 31:
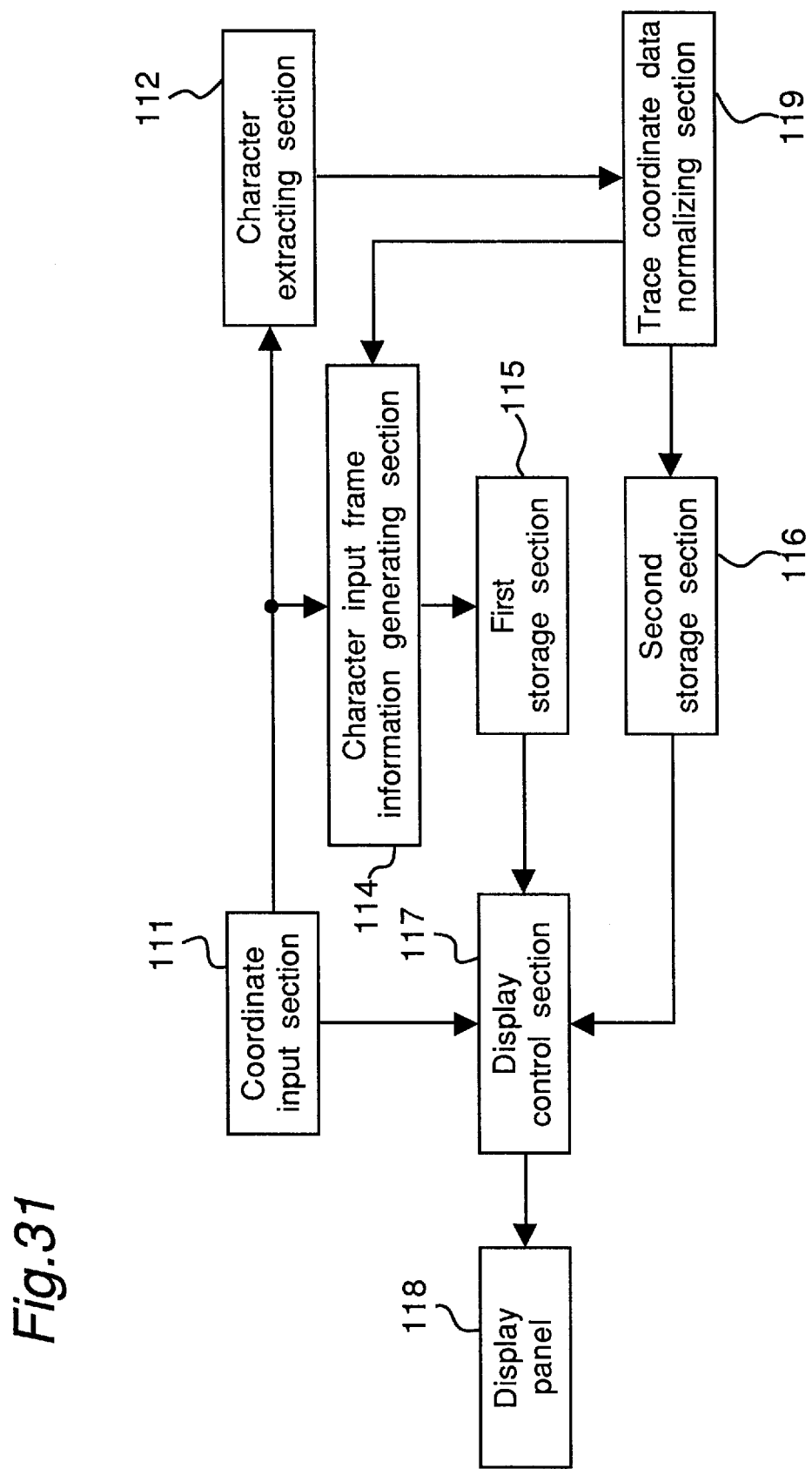
FIG. 31 is a block diagram of a device for inputting characters by handwriting different from those of FIGS. 1, 12, 22 and 29.

FIG. 31 is a block diagram of the device for inputting characters by handwriting of the present embodiment.

A coordinate input section 111, a character extracting section 112, a character input frame information generating section 114, a first storage section 115, a second storage section 116, and a display panel 118 have the same constructions as those of the coordinate input section 11, character extracting section 12, character input frame information generating section 14, first storage section 15, second storage section 16 and display panel 18 of the first embodiment, and operates in a similar manner to display a character input frame on the display panel 118.

A trace coordinate data normalizing section 119 examines the value of the height of an extracted character based on the trace coordinate data of one character extracted by the character extracting section 112, and normalizes the trace coordinate data of the one character so that the height comes to have a predetermined value. That is, the size (so-called the top-to-bottom size) of the character trace is uniformed to a size. Then, the normalized trace coordinate data is stored in the second storage section 116, and normalization completion information is transmitted to the character input frame information generating section 114.

Then, the display control section 117 displays on the display panel 118 the normalized character trace based on the normalized trace coordinate data stored in the second storage section 116, the character input frame based on the character input information stored in the first storage section 115 and the trace of the handwriting character based on the trace coordinate data from the coordinate input section 111.

Further, when the trace coordinate data normalizing section 119 completes the normalization and no subsequent character is written in the displayed character input frame, the character input frame displayed on the display panel 118 in a manner as described above is erased together with the trace of the handwriting character.

Sixth Embodiment

The present embodiment is related to a device for inputting characters by handwriting in which a traced character that has been extracted from a handwriting input character and then normalized is displayed on the display panel, and when a subsequent handwriting character is inputted to an area outside of the character input frame displayed on the display panel, the displayed character input frame is erased and a character input frame is displayed in a position in which a character is newly inputted by handwriting.

Figure 32:
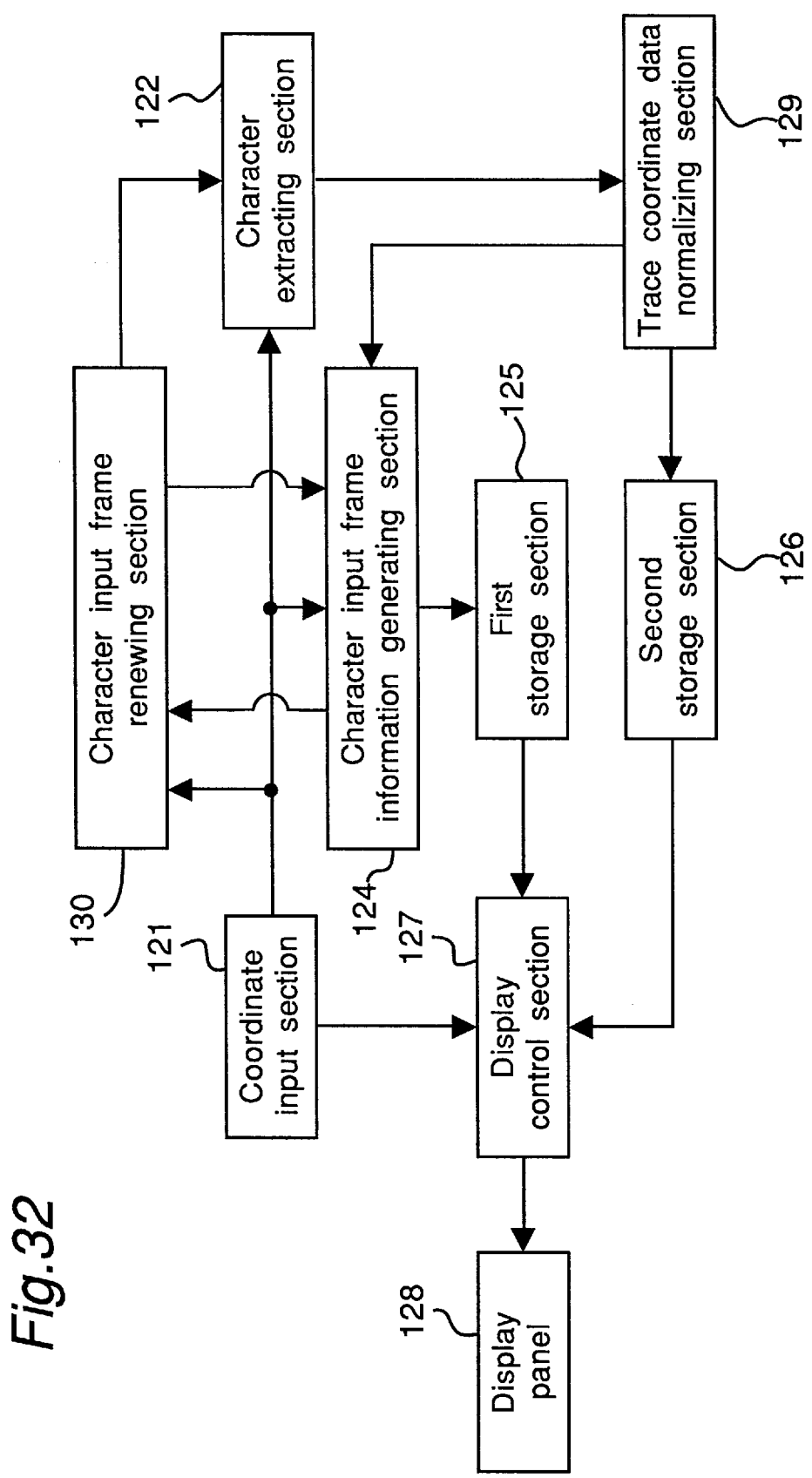
FIG. 32 is a block diagram of a device for inputting characters by handwriting different from those of FIGS. 1, 12, 22, 29 and 31.
Figure 33:
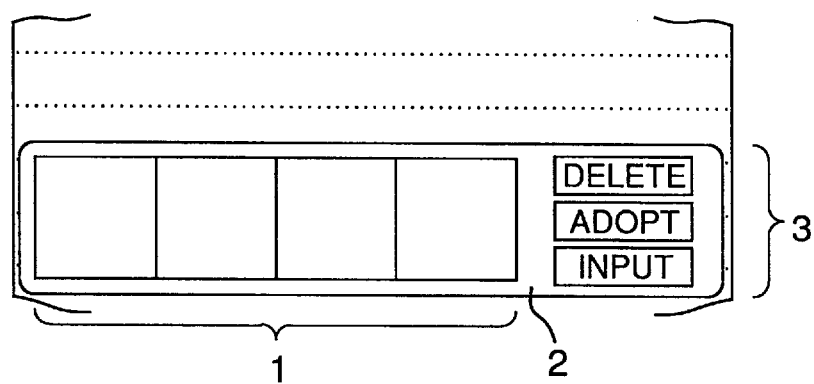
FIG. 33 is a view showing an exemplified display screen of a prior art device for inputting characters by handwriting.
Figure 34A:
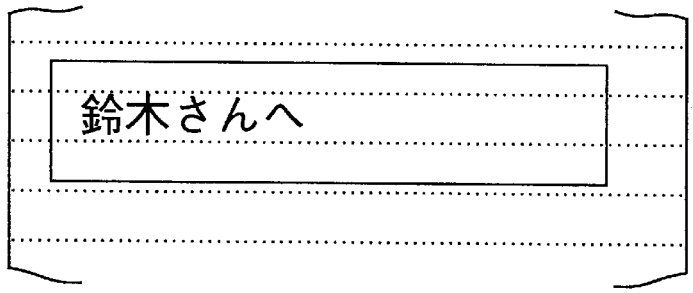
FIGS. 34A through 34D are views showing an exemplified operation of the prior art device for inputting characters by handwriting.
Figure 34B:
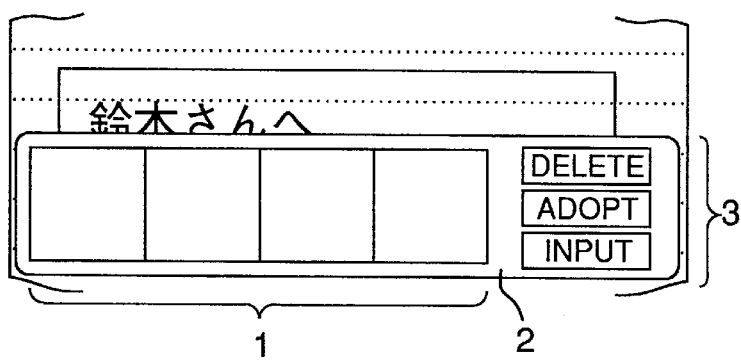
Figure 34C:
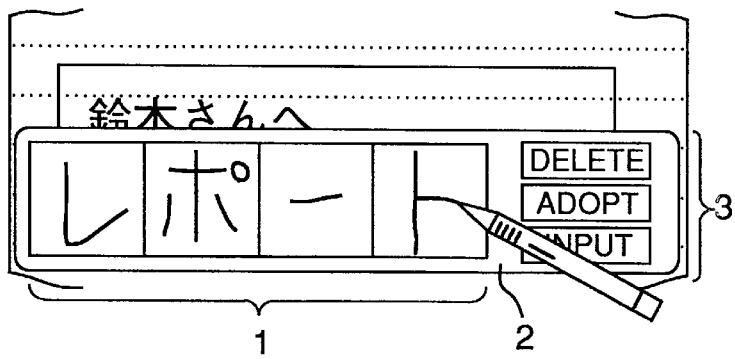
Figure 34D:
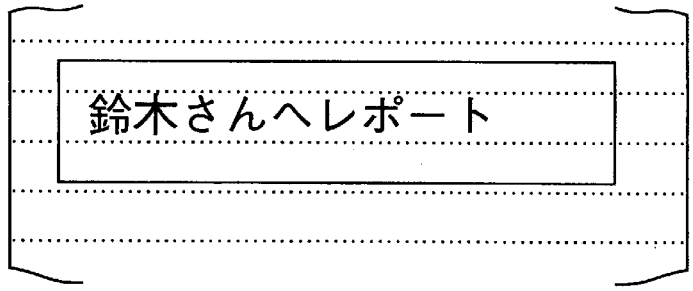

FIG. 32 is a block diagram of the device for inputting characters by handwriting of the present embodiment.

A coordinate input section 121, a character extracting section 122, a character input frame information generating section 124, a first storage section 125, a second storage section 126, a display control section 127, a display panel 128 and a trace coordinate data normalizing section 129 have the same constructions as those of the coordinate input section 111, character extracting section 112, character input frame information generating section 114, first storage section 115, second storage section 116, display control section 117, display panel 118 and trace coordinate data normalizing section 119 of the fifth embodiment, and operates in a similar manner to display a normalized trace and a character input frame on the display panel 118.

Further, a character input frame renewing section 130 has the same construction as that of the character input frame renewing section 79 of the third embodiment, and operates in a similar manner to watch for a handwriting character input outside the currently displayed character input frame based on the trace coordinate data transmitted successively from the coordinate input section 121 and the coordinates of the currently displayed character input frame stored in the internal memory. When a handwriting character input occurs outside the character input frame, character input frame renewal information is transmitted to the character input frame information generating section 124.

When the character input frame information generating section 124 receives the character input frame renewal information before it receives the normalization completion information from the trace coordinate data normalizing section 129, it calculates the frame display position data (x,y) representing an initial input position outside the currently displayed character input frame and the number N of the cells based on the current coordinate input position information from the coordinate input section 121, and renews the storage contents of the first storage section 125 according to the result of calculation.

Consequently, the character input frame displayed on the display panel 128 is erased by the display control section 127, and the next character input frame is displayed in a position expressed by new frame display position data (x,y).

Thus, according to the sixth embodiment, in a device for inputting characters by handwriting in which the traced character that has been extracted from the handwriting input character and then normalized is displayed on the display panel by combining the fifth embodiment with the third embodiment, when a character is inputted by handwriting outside the currently displayed character input frame, the display of the character input frame is renewed. According to the present invention, it is acceptable to further combine the fifth embodiment with the second embodiment or the fourth embodiment.

Furthermore, the second embodiment, the third embodiment and the fourth embodiment may be arbitrarily combined with one another.

It is to be noted that the algorithm of the character input frame display control operation and the character input frame displaying/renewing operation of the present invention are not limited to the flowcharts of FIGS. 4, 9, 11, 23, 25, 26, 27 and 28.

Furthermore, the algorithm of coordinate calculation of the valid area of the present invention is not limited to the algorithm described in connection with the second embodiment.

As apparent from the above, according to the device for inputting characters by handwriting of the present invention, character input frame information is generated by the character input frame information generating section based on the trace coordinate data from the input section, and the information is written in the first storage section. Then, in addition to the display of the recognized character and the display of the trace of the handwriting character input on the display panel by the character extracting section and the character recognizing section, the character input frame is displayed by the display control section based on the character input frame information written in the first storage section with the initial input position on the display panel used as the reference position. Therefore, the character input frame can be automatically displayed in a popping-up manner in the position in which the operator desires to input a character by handwriting, and the character inputted by handwriting in the displayed character input frame can be automatically extracted and recognized.

Therefore, according to the present invention, handwriting character input capable of concurrently satisfying both natural note-taking and improvement of certainty in extracting and recognizing a character can be achieved.

Furthermore, according to the device for inputting characters by handwriting of a further embodiment, the character input frame information is generated by the character input frame information generating section based on the trace coordinate data from the input section, and the information is written in the first storage section. Then, in addition to the display of the normalized trace and the handwriting input trace on the display panel by the character extracting section and the trace coordinate data normalizing section, the character input frame is displayed by the display control section based on the character input frame information written in the first storage section with the initial input position on the display panel used as the reference position. Therefore, the character input frame can be automatically displayed in a popping-up manner in the position in which the operator desires to input a character by handwriting, and the character inputted by handwriting in the displayed character input frame can be automatically extracted.

Therefore, according to the further embodiment, handwriting character input capable of concurrently satisfying both natural note-taking and improvement of certainty in extracting a character can be achieved.

Furthermore, in a device for inputting characters by handwriting of a still further embodiment, the character input frame information is formed with the character input frame display position that is the initial input position, the number of cells constituting the character input frame and the dimensions of the cells, while the display control section displays the character input frame comprised of a series of cells continued in a direction based on the character input frame information with the cell having the dimensions enclosing the reference position on the display panel used as the foremost cell. Therefore, the character input frame comprised of a plurality of series of cells is automatically displayed in the display panel position that the operator has initially touched for handwriting.

Furthermore, in the device for inputting characters by handwriting of a yet further embodiment, the character input frame information generating section comprises cell number calculator to calculate the number of cells based on the distance from the reference position to the end of the display area in the one direction and the dimensions of the cells. Therefore, whatever position a character begins to be written from on the display panel, the character input frame is displayed fully from the position to the end of the display area.

Therefore, according to the present embodiment, the display area can be effectively utilized in displaying the character input frame.

Furthermore, in the devices for inputting characters by handwriting of the embodiments, when the recognition completion information is transmitted from the character recognizing section, or the normalization completion information is transmitted from the trace coordinate data normalizing section to the character input frame information generating section, then the storage contents of the first storage section are erased by the character input frame information generating section to erase the character input frame. Therefore, every time the character recognition or trace normalization is executed, the erasing of the character input frame and the display of a new character input frame are automatically effected.

Therefore, according to the present embodiment, handwriting character input can be performed without taking care of the troublesome displaying/erasing of the character input frame.

Furthermore, in the device for inputting characters by handwriting of an additional embodiment, the character input frame information generating section comprises a handwriting input stop time counter, and operates to erase the storage contents of the first storage section upon the lapse of a specified time from stoppage of the handwriting input and erase the character input frame displayed on the display panel. Therefore, the character input frame is displayed only when a character is inputted by handwriting.

Therefore, according to the present embodiment, more natural note-taking can be achieved.

Furthermore, in the devices for inputting characters by handwriting of the embodiments, the code data of the recognized character or the normalized trace coordinate data is stored in the second storage section by the character recognizing section or the trace coordinate data normalizing section. Meanwhile, the display control section displays the trace of the handwriting input, character input frame, normalized trace or printing type based on the trace coordinate data, character input frame information, character code data or normalized trace coordinate data which are controlled mutually independently. Therefore, the character recognition or the normalization of the trace can be correctly executed without being influenced by the displayed trace of the handwriting input, the character input frame, or the like.

Furthermore, in the device for inputting characters by handwriting of another embodiment, the character input frame is displayed only by the line segments that form the frame by the display control section. Therefore, the character input frame that is interiorly transparent is displayed on the display panel.

Therefore, even when the character input frame is displayed on the printing types, figures and ruled lines that have been already displayed on the display panel, the printing types, figures and ruled lines can be visually perceived, thereby allowing a character to be easily inputted by handwriting with reference to already inputted sentences or figures.

Furthermore, in the device for inputting characters by handwriting of a still additional embodiment, a valid area is set around the character input frame by the handwriting input validity deciding section. When the foremost trace coordinate data of a series of trace coordinate data exists in the character input frame or the valid area, it is decided that the trace coordinate data is valid, and the valid/invalid information is transmitted to the character extracting section. Therefore, the character extracting section can extract the character by deciding that trace coordinate data is valid when the data exists in the valid area even though the foremost trace coordinate data is jutting out of the character input frame.

Therefore, according to the present embodiment, the operator can smoothly perform handwriting input without taking care of beginning writing a character from the displayed character input frame.

Furthermore, in the device for inputting characters by handwriting of a still further embodiment, a valid area is set around the character input frame by the handwriting input validity deciding section. When the whole data of a series of trace coordinate data exists in the character input frame or the valid area, it is decided that the trace coordinate data is valid, and the valid/invalid information is transmitted to the character extracting section. Therefore, the character extracting section can extract the character by deciding that trace coordinate data is valid when the data exists in the valid area even in the case of a character jutting out of the character input frame.

Therefore, according to the present embodiment, the operator can smoothly perform handwriting input without taking care of writing a character inside the displayed character input frame.

Furthermore, in the device for inputting characters by handwriting of another embodiment, when the character input frame renewing section detects that the trace coordinate data has jumped from inside the area of the character input frame to the outside of the area, it transmits the character input frame renewal information to the character input frame information generating section. Meanwhile, the character input frame information generating section generates character input frame information relevant to the trace coordinate data inputted to the outside of the area and renews the contents of the first storage section before it receives the recognition completion information from the character recognizing section or the normalization completion information from the trace coordinate data normalizing section. Therefore, the operator is allowed to perform handwriting input without taking care of the character input frame that is displayed once.

Therefore, according to the present embodiment, handwriting input can be performed in an arbitrary position in which the operator feels easy to write the character by, for example, changing the paragraph with a touch of handwriting the character on an ordinary notebook or the like.

Furthermore, in the device for inputting characters by handwriting of a yet further embodiment, when the size of the character input frame is designated by the character input frame size designating section, the dimension information of the character input frame corresponding to the size of the designated character input frame is read from the dimension information storing section by the character input frame information generating section, and the dimension information and the character input frame information are written into the first storage section. Therefore, the character input frame corresponding in size to the dimension information is displayed in a popping-up manner on the display panel by the display control section.

Therefore, according to the present embodiment, the operator is allowed to input a character by handwriting in a size desired by the operator from the beginning. Therefore, the operator is allowed to have an expanded range of selection, including the option of handwriting a lot of small characters at a stretch.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device for inputting characters by handwriting in which trace coordinate data of a character is extracted by a character extracting section from trace coordinate data from an input section laminated on a display panel, the extracted character being recognized by a character recognizing section to thereby display on the display panel a trace of a handwriting input based on the trace coordinate data and the recognized character by a display control section, comprising:

a character input frame information generating section which generates character input frame information for displaying a character input frame representing a handwriting input area in accordance with an initial input position on the display panel where the trace of the handwriting has been inputted and stores the information into a first storage section, the display control section displaying on the display panel the trace of the handwriting input and the recognized character as well as the character input frame with the initial input position displayed within the character input frame on the display panel used as a reference position based on the character input frame information stored in said first storage section.

2. A device for inputting characters by handwriting in which trace coordinate data of a character is extracted by a character extracting section from trace coordinate data from an input section laminated on a display panel, a height of a trace of the extracted character being normalized by a trace coordinate data normalizing section to thereby display on the display panel a trace of a handwriting input based on the trace coordinate data and the normalized trace by a display control section, comprising:

a character input frame information generating section which generates character input frame information for displaying a character input frame representing a handwriting input area in accordance with an initial input position on the display panel where the trace of the handwriting has been inputted and stores the information into a first storage section, the display control section displaying on the display panel the trace of the handwriting input and the normalized trace as well as the character input frame with the initial input position displayed within the character input frame on the display panel used as a reference position based on the character input frame information stored in said first storage section.

3. The device for inputting characters by handwriting as claimed in claim 1, wherein the character input frame information generated by said character input frame information generating section comprises a character input frame display position that is the initial input position on the display panel, a number of cells constituting the character input frame and dimensions of the cells, said display control section displaying on the display panel the character input frame comprising a series of cells continued in a direction based on the character input frame information with a cell that has said dimensions and encloses the reference position on the display panel used as a foremost cell.

4. The device for inputting characters by handwriting as claimed in claim 2, wherein the character input frame information generated by said character input frame information generating section comprises a character input frame display position that is the initial input position on the display panel, a number of cells constituting the character input frame and dimensions of the cells, the display control section displaying on the display panel the character input frame comprising a series of cells continued in a direction based on the character input frame information with a cell that has said dimensions and encloses the reference position on the display panel used as a foremost cell.

5. The device for inputting characters by handwriting as claimed in claim 3, wherein said character input frame information generating section comprising cell number calculating means for calculating a distance from the reference position to an end of a display area in said direction on the display panel based on the character input frame display position and calculating the number of cells based on the distance and the dimensions of the cells.

6. The device for inputting characters by handwriting as claimed in claim 4, wherein said character input frame information generating section comprises cell number calculating means for calculating a distance from the reference position to an end of a display area in said direction on the display panel based on the character input frame display position and calculating the number of cells based on the distance and the dimensions of the cells.

7. The device for inputting characters by handwriting as claimed in claim 1, wherein the character recognizing section transmits recognition completion information representing completion of the character recognition to said character input frame information generating section when character recognition is completed, said character input frame information generating section erasing storage contents of said first storage section upon receiving the recognition completion information from the character recognizing section and erasing the character input frame displayed on the display panel.

8. The device for inputting characters by handwriting as claimed in claim 2, wherein the trace coordinate data normalizing section transmits normalization completion information representing completion of the normalization to said character input frame information generating section when normalization is completed, said character input frame information generating section erasing storage contents of said first storage section upon receiving the normalization completion information from the trace coordinate data normalizing section and erasing the character input frame displayed on the display panel.

9. The device for inputting characters by handwriting as claimed in claim 1, wherein said character input frame information generating section comprises handwriting input stop time counting means for counting a time elapsed from stoppage of the handwriting input based on the trace coordinate data from the input section, said character input frame information generating section erasing storage contents of said first storage section when the handwriting input stop time reaches a specified time and erasing the character input frame displayed on the display panel.

10. The device for inputting characters by handwriting as claimed in claim 2, wherein said character input frame information generating section comprises handwriting input stop time counting means for counting a time elapsed from stoppage of the handwriting input based on the trace coordinate data from the input section, said character input frame information generating section erasing storage contents of said first storage section when the handwriting input stop time reaches a specified time and erasing the character input frame displayed on the display panel.

11. The device for inputting characters by handwriting as claimed in claim 1, further comprising:

a second storage section which stores character code data of the character recognized by the character recognizing section, the display control section displaying the trace of the handwriting input based on the trace coordinate data from the input section, displaying the character input frame based on the character input frame information written in said first storage section, and displaying a printing type of the recognized character based on the character code data stored in said second storage section.

12. The device for inputting characters by handwriting as claimed in claim 2, further comprising:

a second storage section which stores trace coordinate data normalized by the trace coordinate data normalizing section, the display control section displaying the trace of the handwriting input based on the trace coordinate data from the input section, displaying the character input frame based on the character input frame information written in said first storage section, and displaying a normalized trace based on the normalized trace coordinate data stored in said second storage section.

13. The device for inputting characters by handwriting as claimed in claim 1, wherein the display control section is constructed so that the character input frame is displayed only by line segments that form a frame of the character input frame based on the character input frame information.

14. The device for inputting characters by handwriting as claimed in claim 2, wherein the display control section is constructed so that the character input frame is displayed only by line segments that form a frame of the character input frame based on the character input frame information.

15. The device for inputting characters by handwriting as claimed in claim 1, further comprising:

a handwriting input validity deciding section which sets a valid area for validating the handwriting input around the character input frame based on the character input frame information generated by said character input frame information generating section, decides that the trace coordinate data is valid when a foremost trace coordinate data of a series of trace coordinate data from the input section exists in the character input frame or the valid area, decides that the trace coordinate data is invalid when the foremost trace coordinate data does not exist in the character input frame or the valid area, and transmits valid/invalid information representing a result of the decision to the character extracting section, the character extracting section extracting only the trace coordinate data of the character constituted by the trace coordinate data that is decided to be valid based on the valid/invalid information from said handwriting input validity deciding section.

16. The device for inputting characters by handwriting as claimed in claim 2, further comprising:

a handwriting input validity deciding section which sets a valid area for validating the handwriting input around the character input frame based on the character input frame information generated by said character input frame information generating section, decides that the trace coordinate data is valid when a foremost trace coordinate data of a series of trace coordinate data from the input section exists in the character input frame or the valid area, decides that the trace coordinate data is invalid when the foremost trace coordinate data does not exist in the character input frame or the valid area, and transmits valid/invalid information representing a result of decision to the character extracting section, the character extracting section extracting only the trace coordinate data of the character constituted by the trace coordinate data that is decided to be valid based on the valid/invalid information from said handwriting input validity deciding section.

17. The device for inputting characters by handwriting as claimed in claim 1, further comprising:

a handwriting input validity deciding section which sets a valid area for validating the handwriting input around the character input frame based on the character input frame information generated by said character input frame information generating section, decides that the trace coordinate data is valid when whole data of a series of trace coordinate data from the input section exists in the character input frame or the valid area, decides that the trace coordinate data is invalid when a portion of the trace coordinate data exists in neither the character input frame nor the valid area, and transmits valid/invalid information representing a result of the decision to the character extracting section, the character extracting section extracting only the trace coordinate data of the character constituted by the trace coordinate data that is decided to be valid based on the valid/invalid information from said handwriting input validity deciding section.

18. The device for inputting characters by handwriting as claimed in claim 2, further comprising:

a handwriting input validity deciding section which sets a valid area for validating the handwriting input around the character input frame based on the character input frame information generated by said character input frame information generating section, decides that the trace coordinate data is valid when whole data of a series of trace coordinate data from the input section exists in the character input frame or the valid area, decides that the trace coordinate data is invalid when a portion of the trace coordinate data exists in neither the character input frame nor the valid area, and transmits valid/invalid information representing a result of the decision to the character extracting section, the character extracting section extracting only the trace coordinate data of the character constituted by the trace coordinate data that is decided to be valid based on the valid/invalid information from said handwriting input validity deciding section.

19. The device for inputting characters by handwriting as claimed in claim 1, further comprising:

a character input frame renewing section which sets an area of the character input frame based on the character input frame information generated by said character input frame information generating section, and upon detecting that the trace coordinate data from the input section jumps from said area to outside of said area, transmits character input frame renewal information for designating renewal of a currently displayed character input frame to said character input frame information generating section, said character input frame information generating section generating character input frame information based on the trace coordinate data inputted to the outside of said area from the input section and renewing contents of said first storage section upon receiving the character input frame renewal information before it receives recognition completion information from the character recognizing section.

20. The device for inputting characters by handwriting as claimed in claim 2, further comprising:

a character input frame renewing section which sets an area of the character input frame based on the character input frame information generated by said character input frame information generating section, and upon detecting that the trace coordinate data from the input section jumps from said area to outside of said area, transmits character input frame renewal information for designating renewal of a currently displayed character input frame to said character input frame information generating section, said character input frame information generating section generating character input frame information based on the trace coordinate data inputted to the outside of said area from the input section and renewing contents of said first storage section upon receiving the character input frame renewal information before it receives normalization completion information from the trace coordinate data normalizing section.

21. The device for inputting characters by handwriting as claimed in claim 1, further comprising:

a character input frame size designating section for designating a size of the character input frame; and a dimension information storing section for storing therein dimension information of the character input frame corresponding to the size of the character input frame, said character input frame information generating section reading from said dimension information storing section the dimension information of the character input frame corresponding to the size of the character input frame designated by said character input frame size designating section and writing the dimension information and the character input frame information into said first storage section, the display control section displaying on the display panel the character input frame corresponding in size to the dimension information based on the character input frame information and the dimension information written in said first storage section.

22. The device for inputting characters by handwriting as claimed in claim 2, further comprising:

a character input frame size designating section for designating a size of the character input frame; and a dimension information storing section for storing therein dimension information of the character input frame corresponding to the size of the character input frame, said character input frame information generating section reading from said dimension information storing section the dimension information of the character input frame corresponding to the size of the character input frame designated by said character input frame size designating section and writing the dimension information and the character input frame information into said first storage section, the display control section displaying on the display panel the character input frame corresponding in size to the dimension information based on the character input frame information and the dimension information written in said first storage section.

23. A display apparatus comprising:

a display having a display area for displaying images and an input section on which handwritten characters are input thereon, said input section being on said display area;

generation means for generating character input frame information representing a character input frame in which the handwritten characters are to be input on said display, the character input frame being generated based on trace coordinate data of a handwritten character; and display control means for controlling said display in accordance with the character input frame information to display the character input frame, the handwritten character being displayed within a first frame of the character input frame.

24. The display apparatus of claim 23, wherein the character input frame information comprises an initial input position of a trace of the handwritten character on said display, a number of frames of the character input frame and dimensions of the frames.

25. The display apparatus of claim 24, wherein said generation means determines a distance from the initial input position of the trace of the handwritten character to an end of said display area and determines the number of frames and the dimensions of the frames based on the determined distance.

26. The display apparatus of claim 23, wherein the character input frame comprises only displayed lines so that images displayed in said display area are not obscured.

27. The display apparatus of claim 23, further comprising validation means for determining that handwritten characters input subsequent display of the character input frame are valid if the trace coordinate data of the handwritten characters are input within a predetermined valid area around a corresponding frame or within the corresponding frame.

28. The display apparatus of claim 23, wherein said generation means sets an area around the character input frame and upon determination that trace coordinate data of a handwritten character input subsequent display of the character input frame jumps from said area to outside of said area, generates new character input frame information representing a new character input frame, the subsequent handwritten character being displayed within a first frame of the new character input frame.

29. The display apparatus of claim 23, further comprising frame size designating means for designating a size of the frames of the character input frame, said generation means generating the character input frame information in further view of the designated size.

30. The display apparatus of claim 23, further comprising character recognizing means for recognizing the identity of the handwritten character based on the trace coordinate data, said display control means controlling said display to also display a recognized version of the handwritten character.

31. The display apparatus of claim 23, further comprising trace normalizing means for normalizing a height of the handwritten character based on the trace coordinate data, said display control means controlling said display to also display the normalized handwritten character.

32. A method of displaying handwritten characters on a display having a display area for displaying images and an input section on which the handwritten characters are input thereon, comprising the steps of:

a) inputting a handwritten character on the input section;

b) generating character input frame information representing a character input frame in which the handwritten characters are to be input on the display, the character input frame information being generated in accordance with trace coordinate data of the handwritten character input in said step a); and c) displaying the character input frame in accordance with the character input frame information generated in said step b), the handwritten character being displayed within a first frame of the character input frame.

* * * * *